March 21, 1967    F. T. CASSIDY, JR    3,310,626
TIME SHARED TELEGRAPH TRANSMISSION SYSTEM INCLUDING
SEQUENCE TRANSMISSION WITH REDUCTION OF
START AND STOP SIGNALS
Filed Feb. 28, 1963                                16 Sheets-Sheet 1
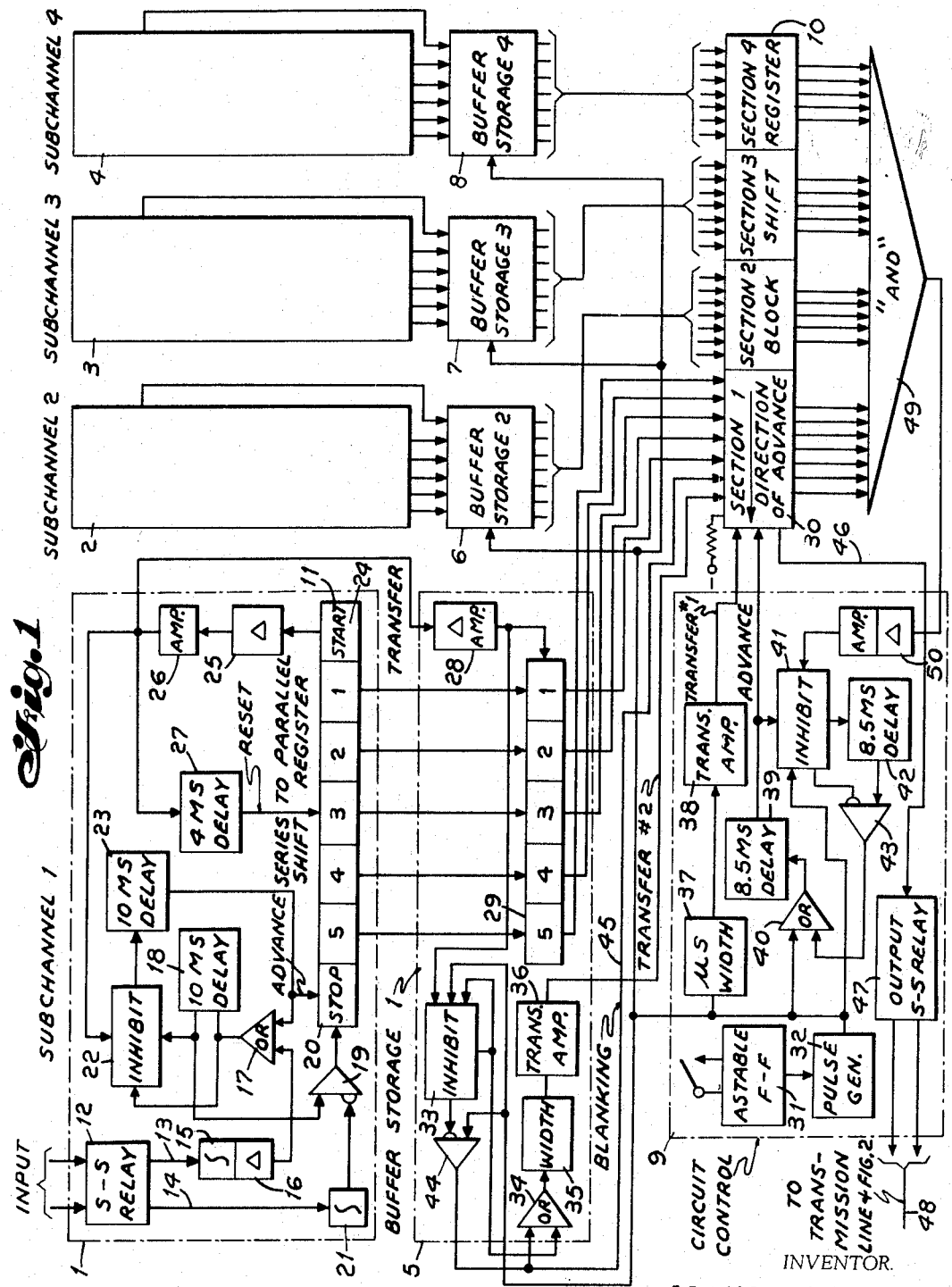
INVENTOR.
FRANCIS T. CASSIDY, JR.
BY
ATTORNEY

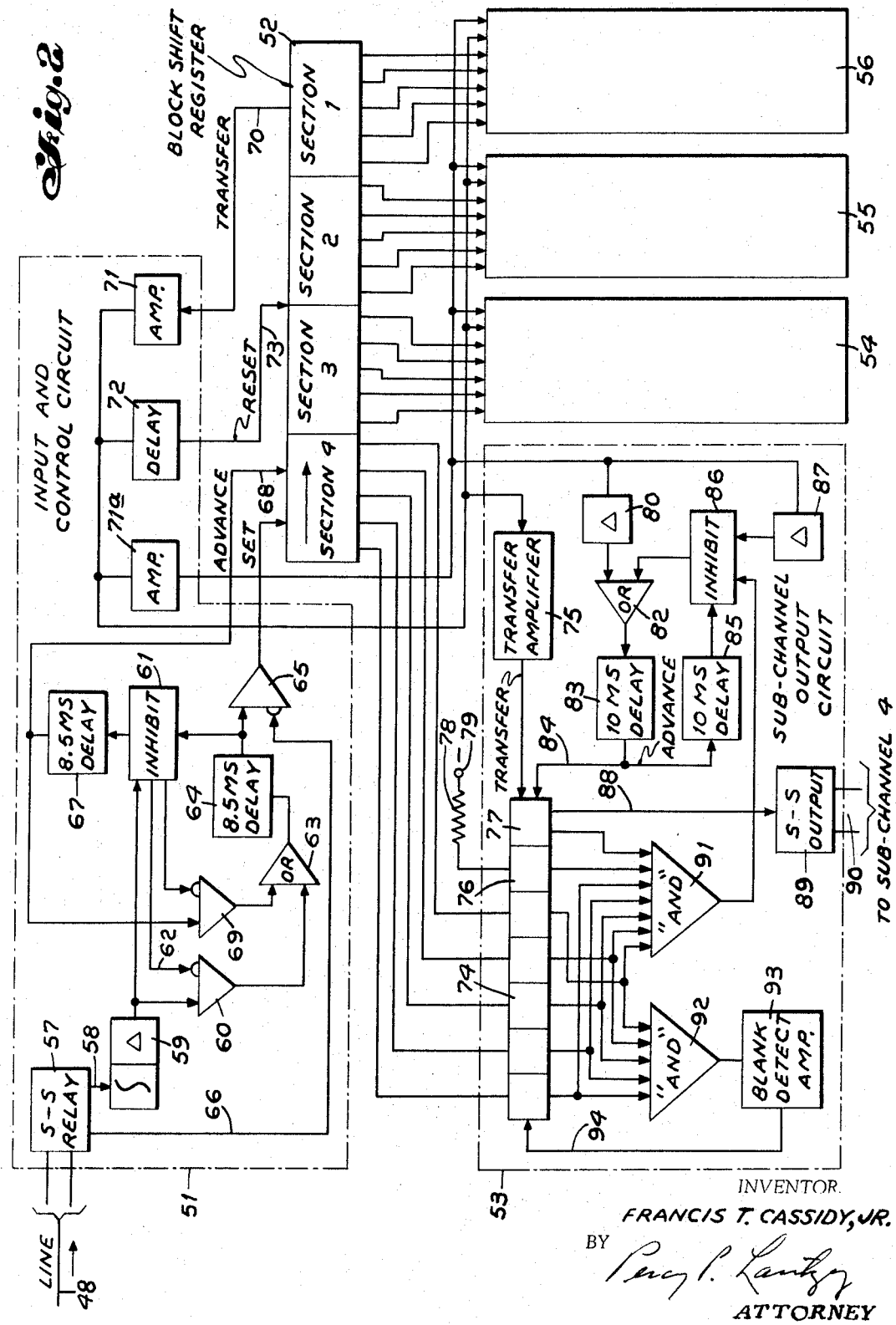

March 21, 1967 F. T. CASSIDY, JR 3,310,626
TIME SHARED TELEGRAPH TRANSMISSION SYSTEM INCLUDING
SEQUENCE TRANSMISSION WITH REDUCTION OF
START AND STOP SIGNALS
Filed Feb. 28, 1963 16 Sheets-Sheet 3
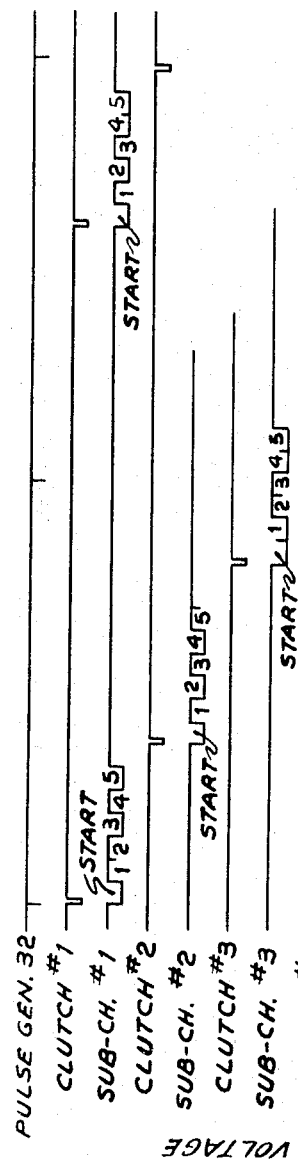
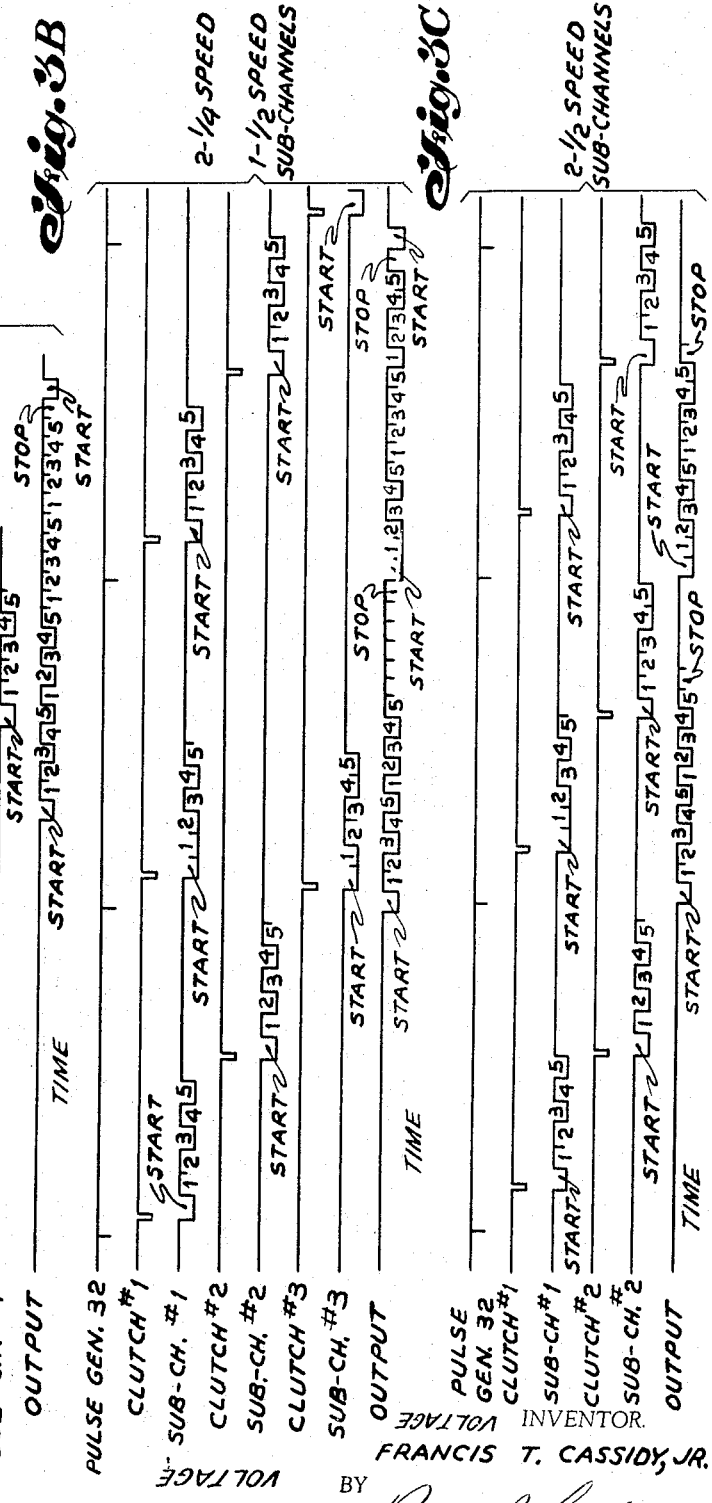
INVENTOR.
FRANCIS T. CASSIDY, JR.
BY
ATTORNEY

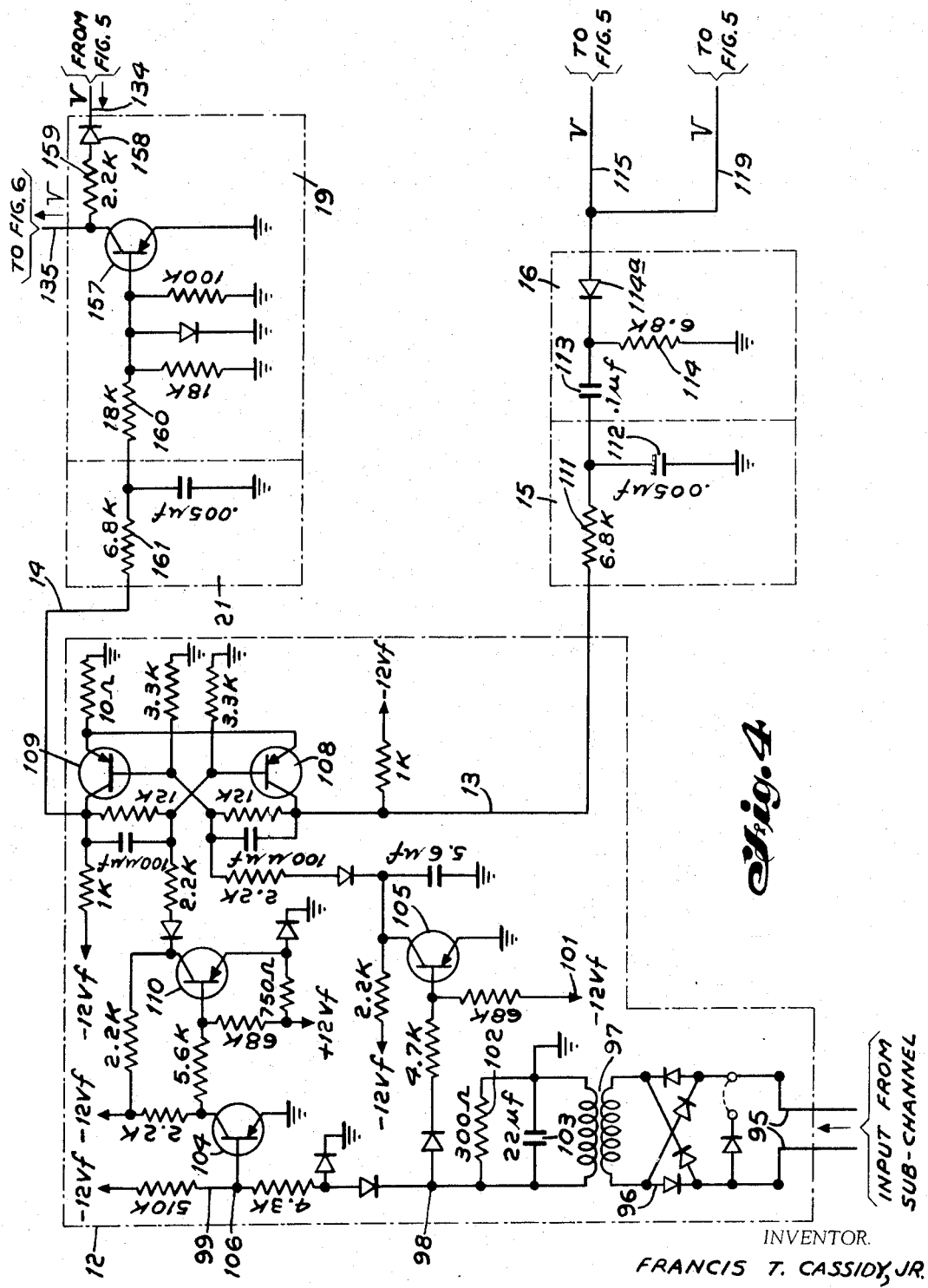

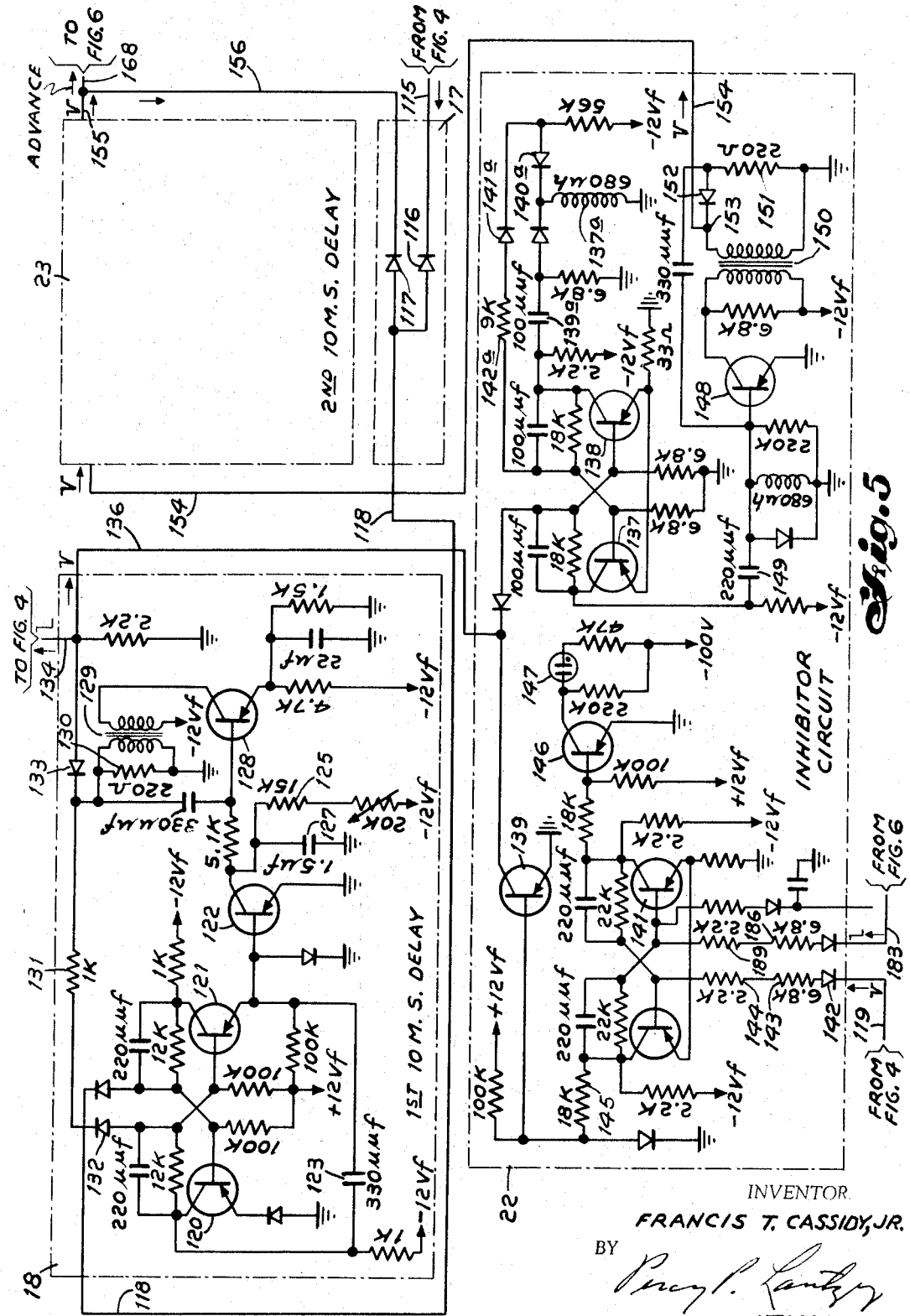

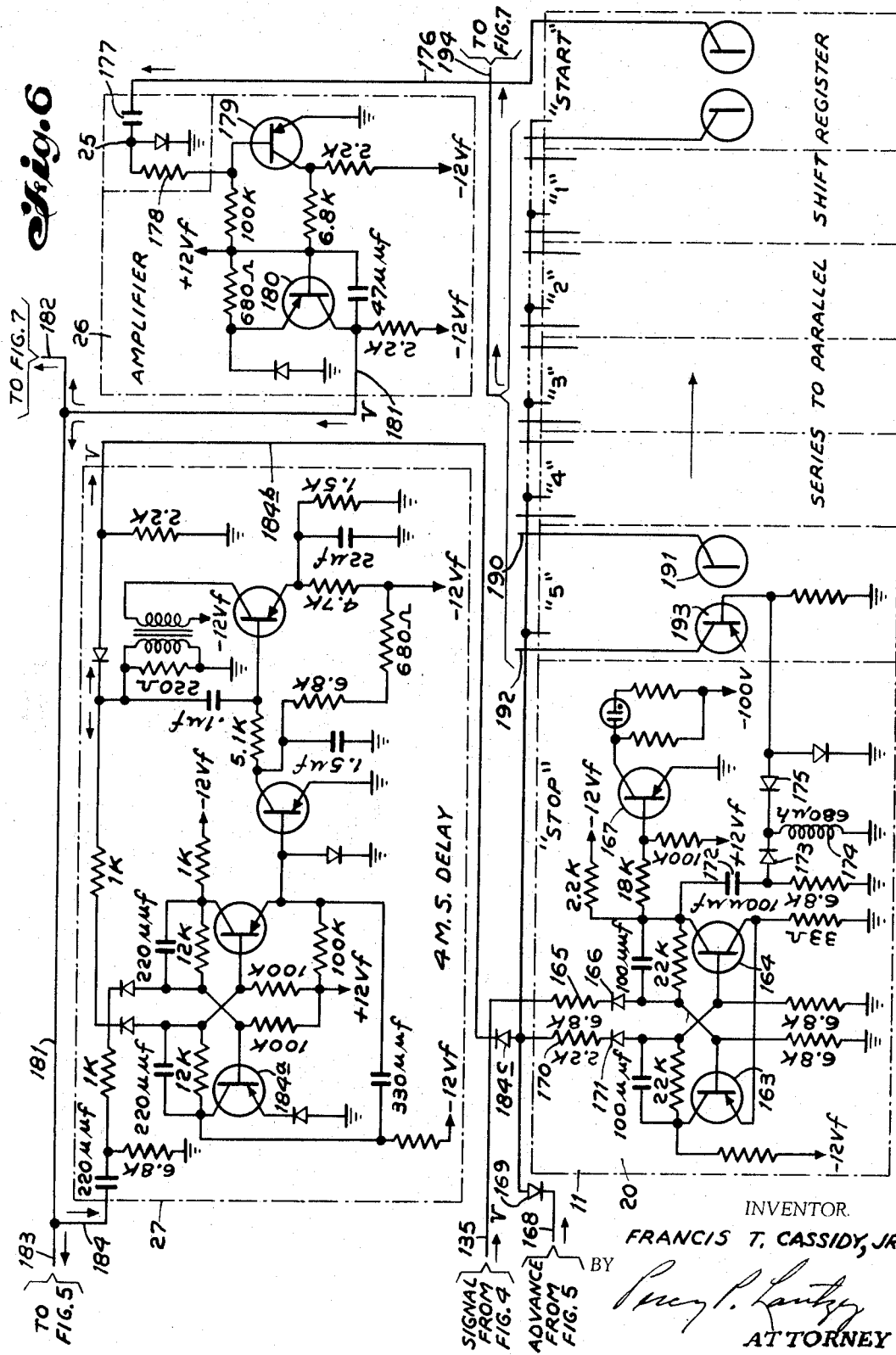

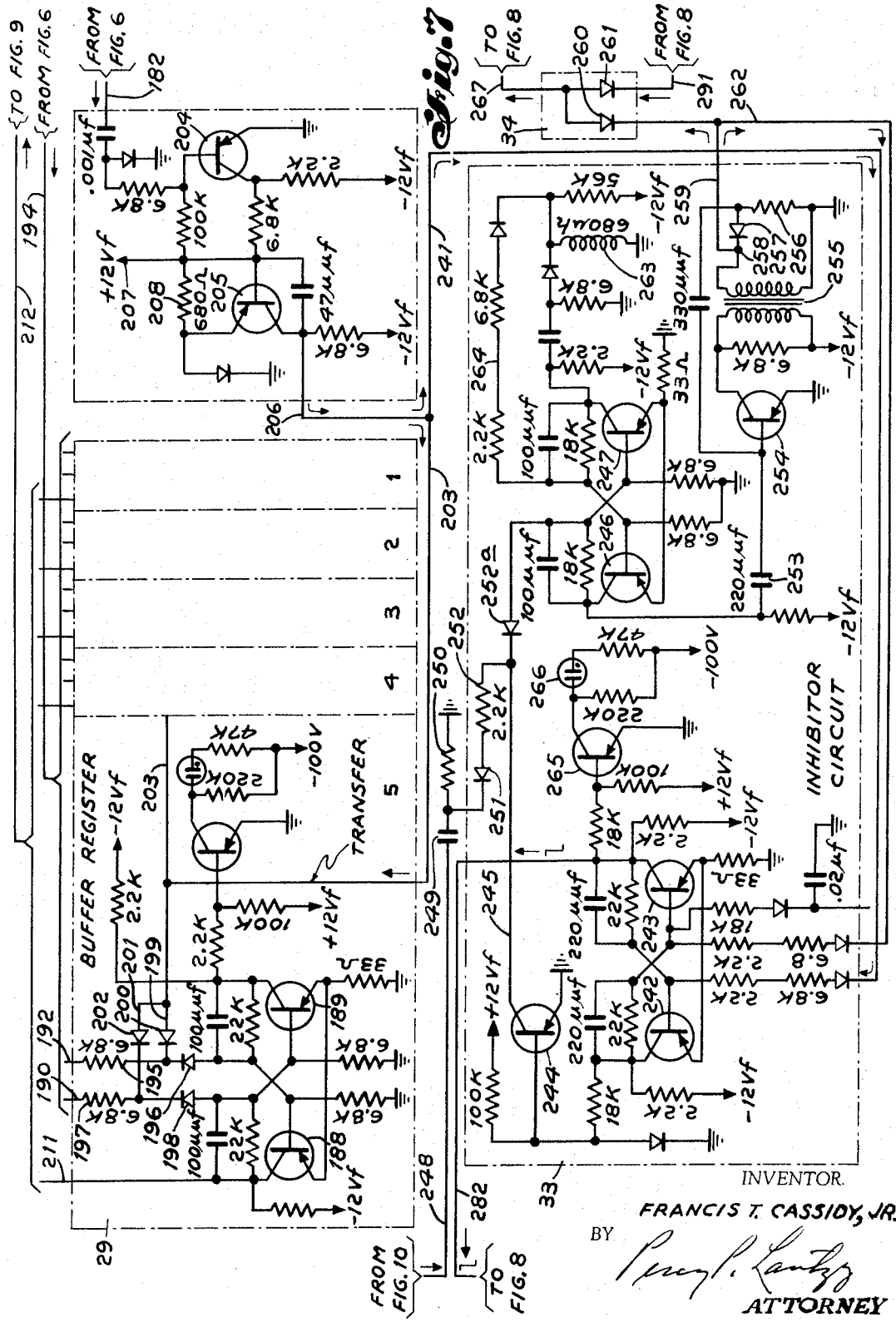

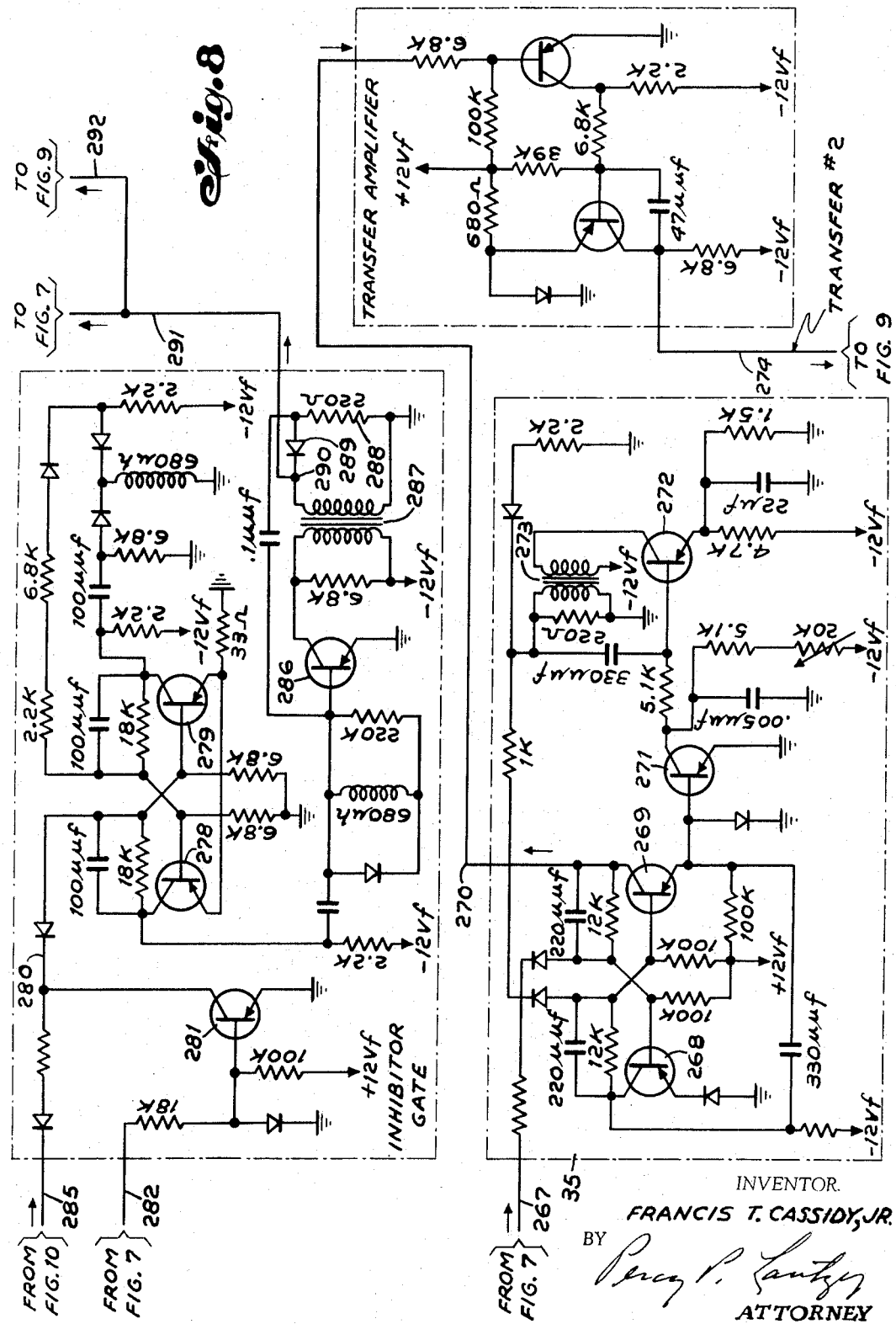

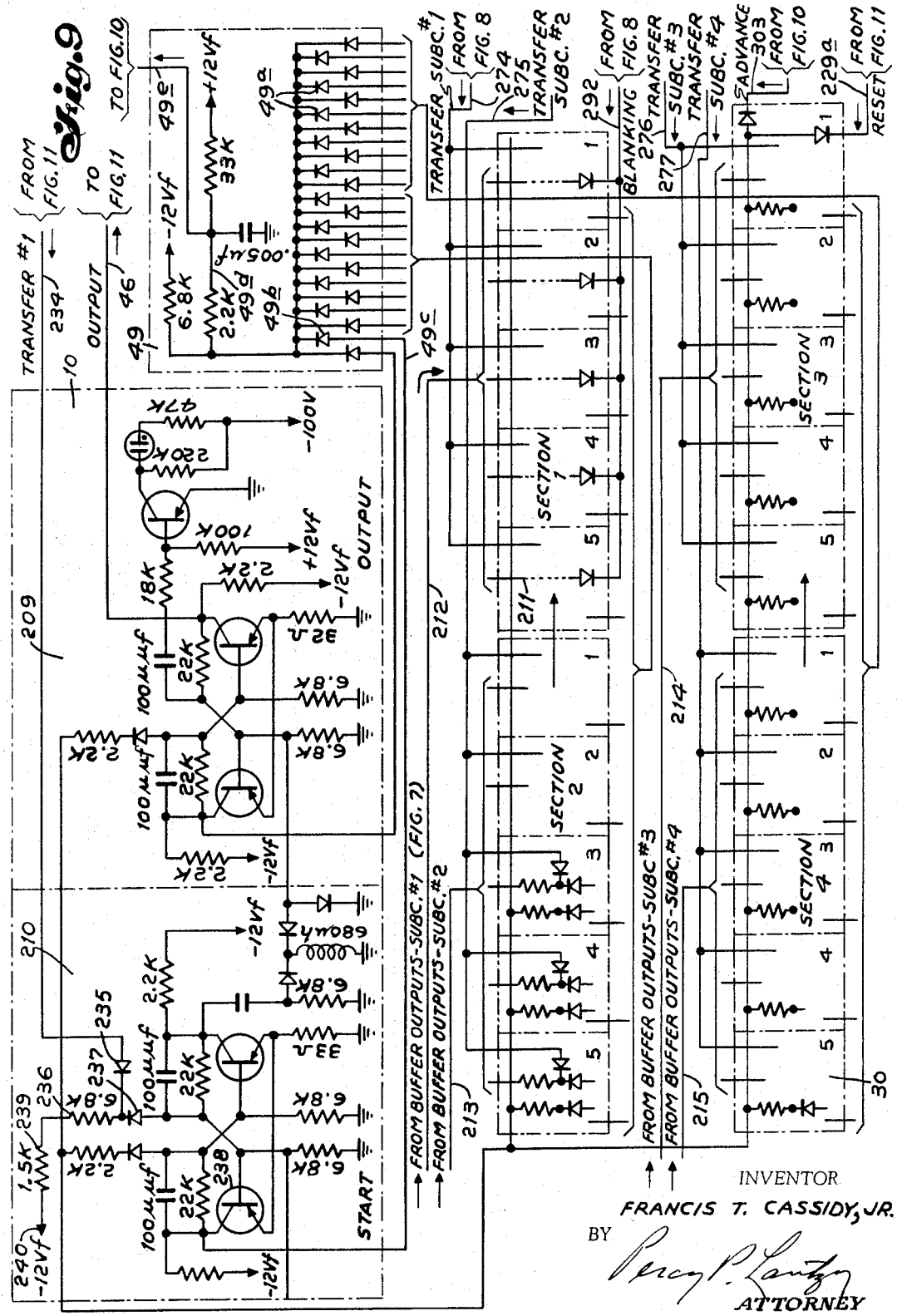

INVENTOR.
FRANCIS T. CASSIDY, JR.
ATTORNEY

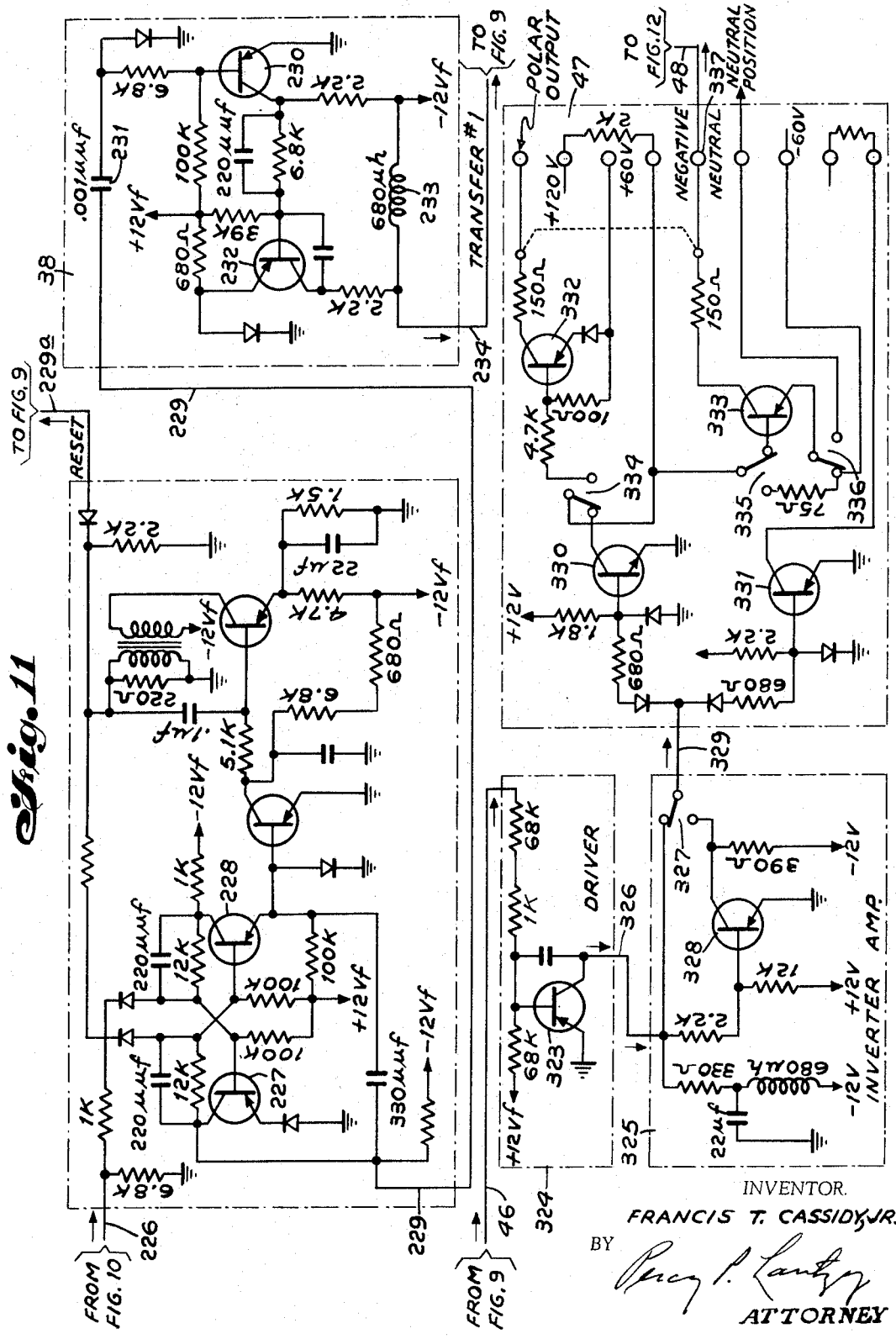

March 21, 1967  F. T. CASSIDY, JR  3,310,626
TIME SHARED TELEGRAPH TRANSMISSION SYSTEM INCLUDING
SEQUENCE TRANSMISSION WITH REDUCTION OF
START AND STOP SIGNALS Filed Feb. 28, 1963  16 Sheets-Sheet 12

INVENTOR.
FRANCIS T. CASSIDY, JR.
BY
ATTORNEY

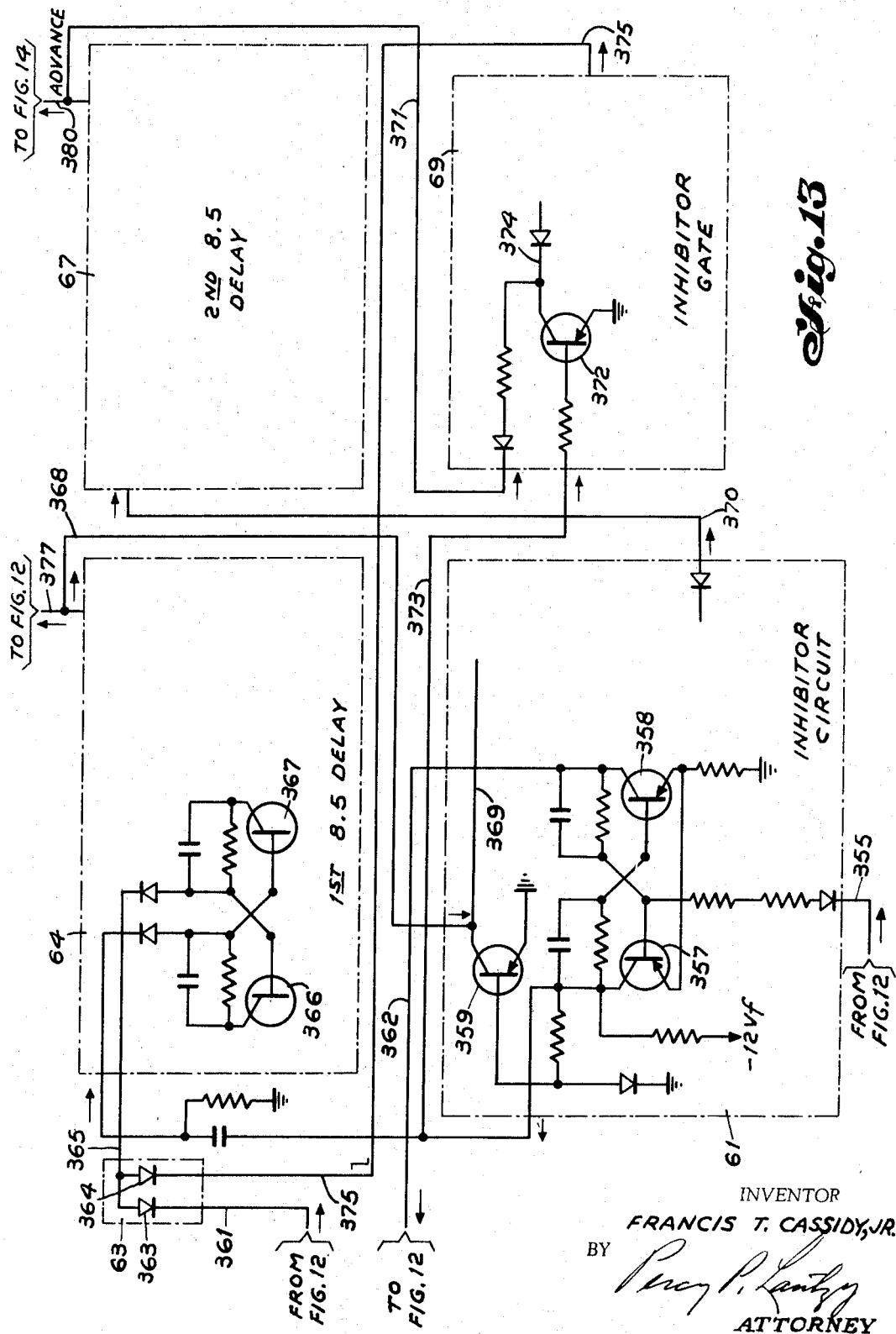

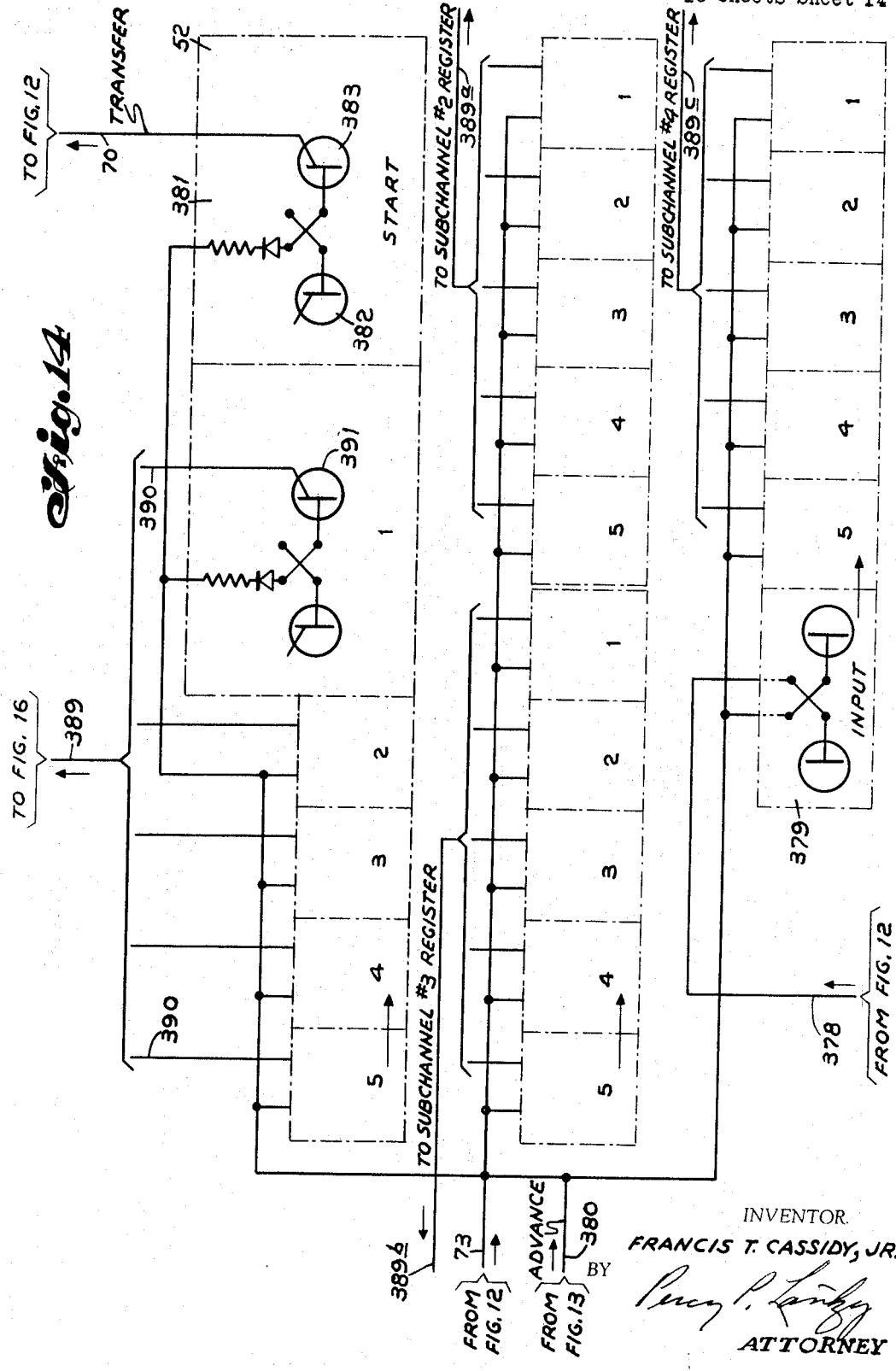

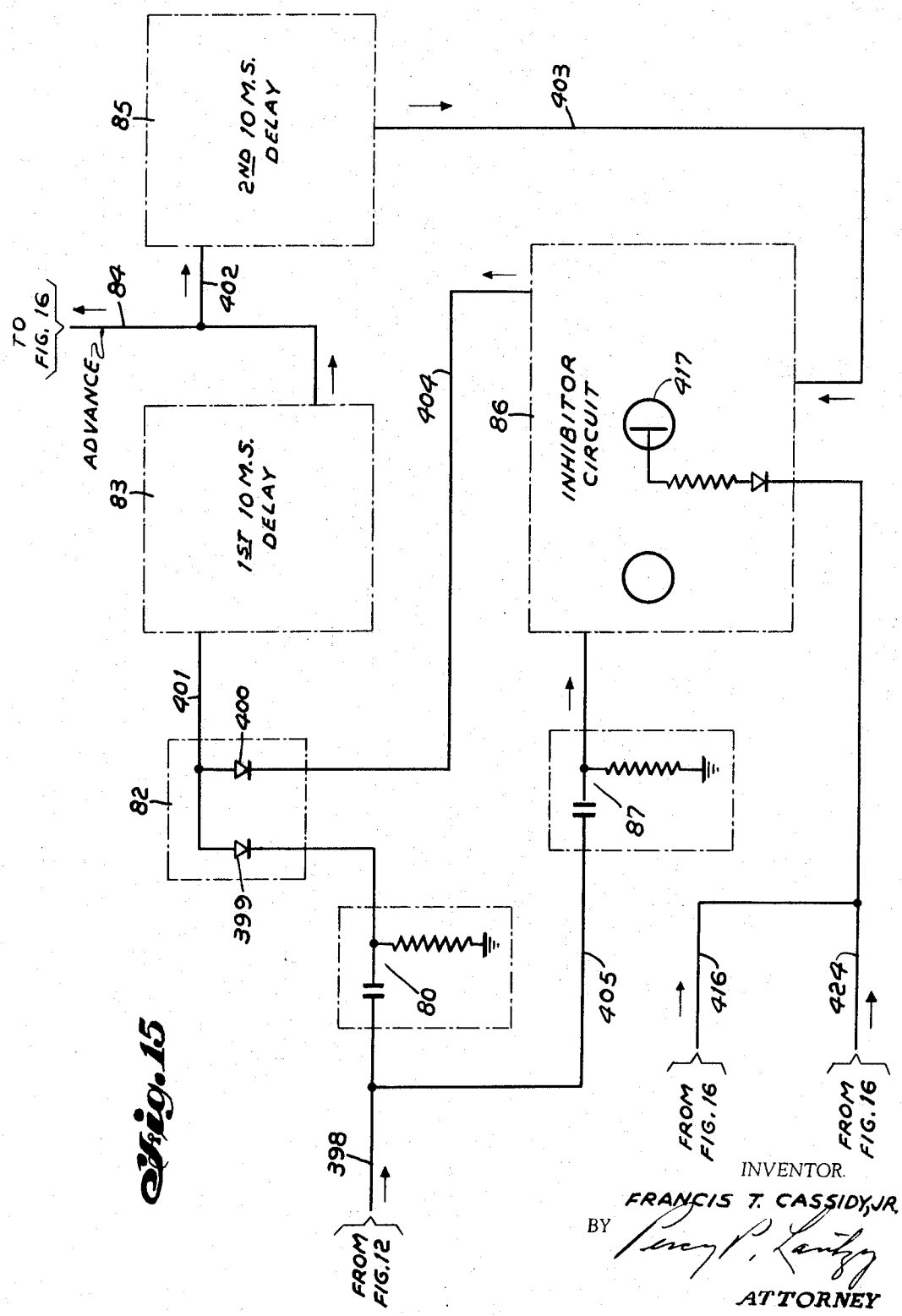

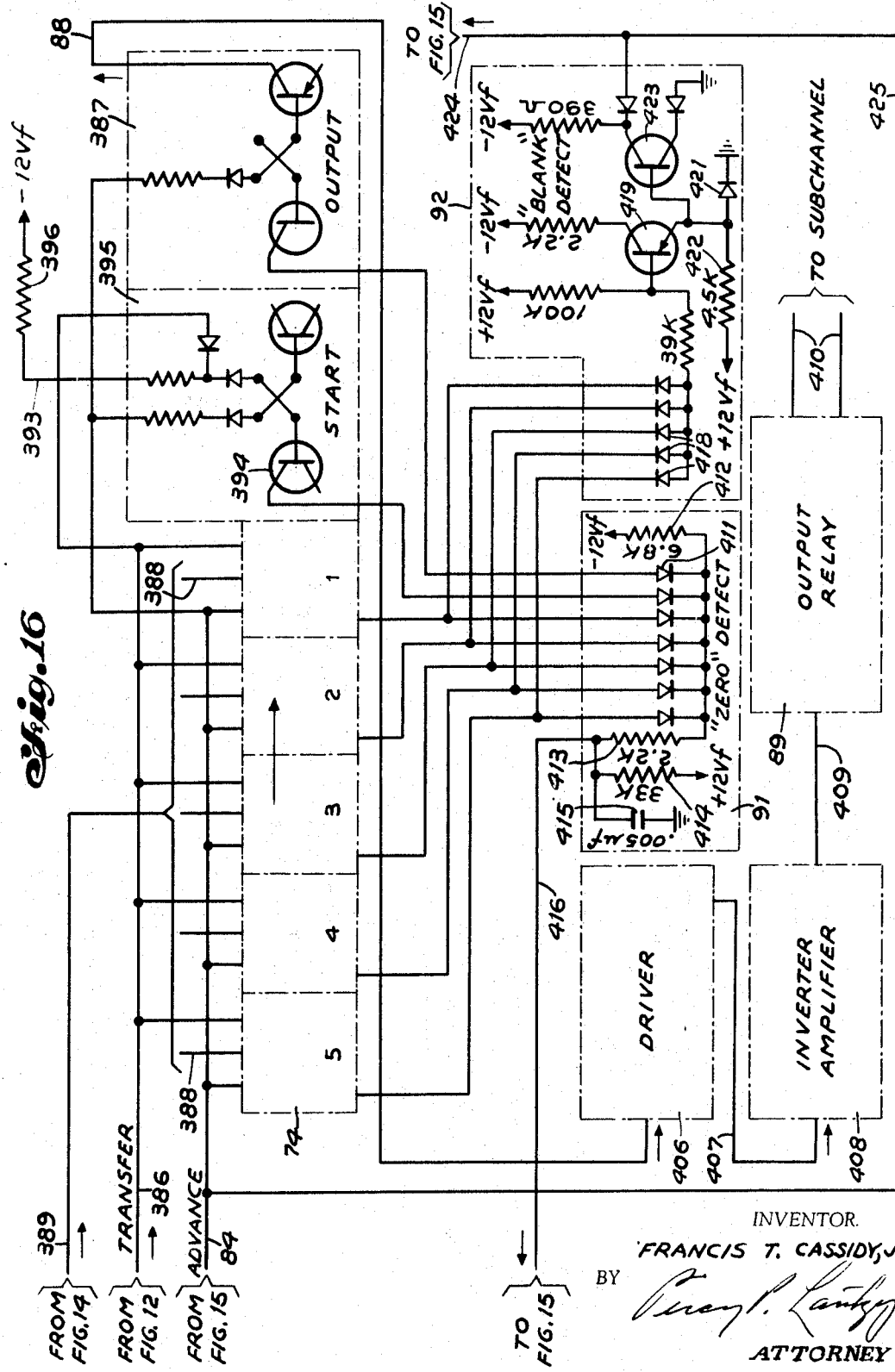

United States Patent Office 3,310,626
Patented Mar. 21, 1967

3,310,626
TIME SHARED TELEGRAPH TRANSMISSION SYSTEM INCLUDING SEQUENCE TRANSMISSION WITH REDUCTION OF START AND STOP SIGNALS
Francis T. Cassidy, Jr., Brooklyn, N.Y., assignor to International Telephone and Telegraph Corporation, Nutley, N.J., a corporation of Maryland
Filed Feb. 28, 1963, Ser. No. 261,676
15 Claims. (Cl. 178—50)

This invention relates to automatic telegraph transmission systems which transmit telegraph signals of the type in which each character comprises a "start" unit, a plurality of intelligence units, and a "stop" unit.

A principal object of the invention is to provide a telegraph channel divider system by means of which signals from a number of subchannels may be transmitted over a single transmission line and redistributed to the corresponding subchannels at the receiving end with a smaller number of signal units than is possible with known systems.

Another object of the invention is to provide a telegraph channel divider system in which any printer channel may be divided into subchannels of fractional speeds.

Another object of the invention is to provide a telegraph channel divider system which is self-synchronous in operation between terminals and therefore does not require initial or operational phasing.

Still another object of the invention is to provide a telegraph channel divider system which may be easily arranged for four quarter-speed subchannels, one half-speed and two quarter-speed, or two half-speed subchannels at an input modulation rate of 50 bauds and an output modulation rate of 58.82 bauds, or, by slight variations in connections may be arranged for various other combinations of subchannel speeds at different output modulation rates.

Still another object of the invention is to provide a completely transistorized telegraph channel divider system which requires a minimum of space and has low power consumption.

Still other objects and advantages of the invention will be apparent as the description proceeds.

The invention has been illustrated in the accompanying drawings, in which:

FIGURES 1 and 2 are block diagrams showing the complete system;

FIGURES 3A, 3B and 3C are timing charts showing the timing for three different combinations of subchannel transmitting speeds;

FIGURE 4 is a circuit diagram of one subchannel input circuit of the transmitting station; FIGURE 5 is a circuit diagram of the cycling circuit for advancing the series-to-parallel register;

FIGURE 6 is a circuit diagram of one series-to-parallel register at the transmitting station with certain associated circuits;

FIGURE 7 is a circuit diagram of one buffer storage circuit at the transmitting station with certain associated circuits;

FIGURE 8 is a circuit diagram of an inhibitor gate and certain associated circuits forming a part of each subchannel input circuit;

FIGURE 9 is a circuit diagram of the block shift register at the transmitting station and the "AND" gate for stopping the cycling operation when the register is empty;

FIGURE 11 is a circuit diagram of the solid-state output relay at the transmitting station together with certain associated circuits;

FIGURE 12 is a circuit diagram of the solid-state relay for the input circuit at the receiving station together with certain associated circuits;

FIGURE 13 is a circuit diagram of the high-speed cycling circuit at the receiving station for controlling the advance of the block shift register;

FIGURE 14 is a circuit diagram of the block shift register at the receiving station;

FIGURE 15 is a circuit diagram of one of the low-speed cycling circuits at the receiving station for controlling the advance of the associated parallel-to-series shift register; and FIGURE 16 is a circuit diagram of one of the parallel-to-series shift registers at the receiving station together with its associated solid-state output relay.

Figure 10:
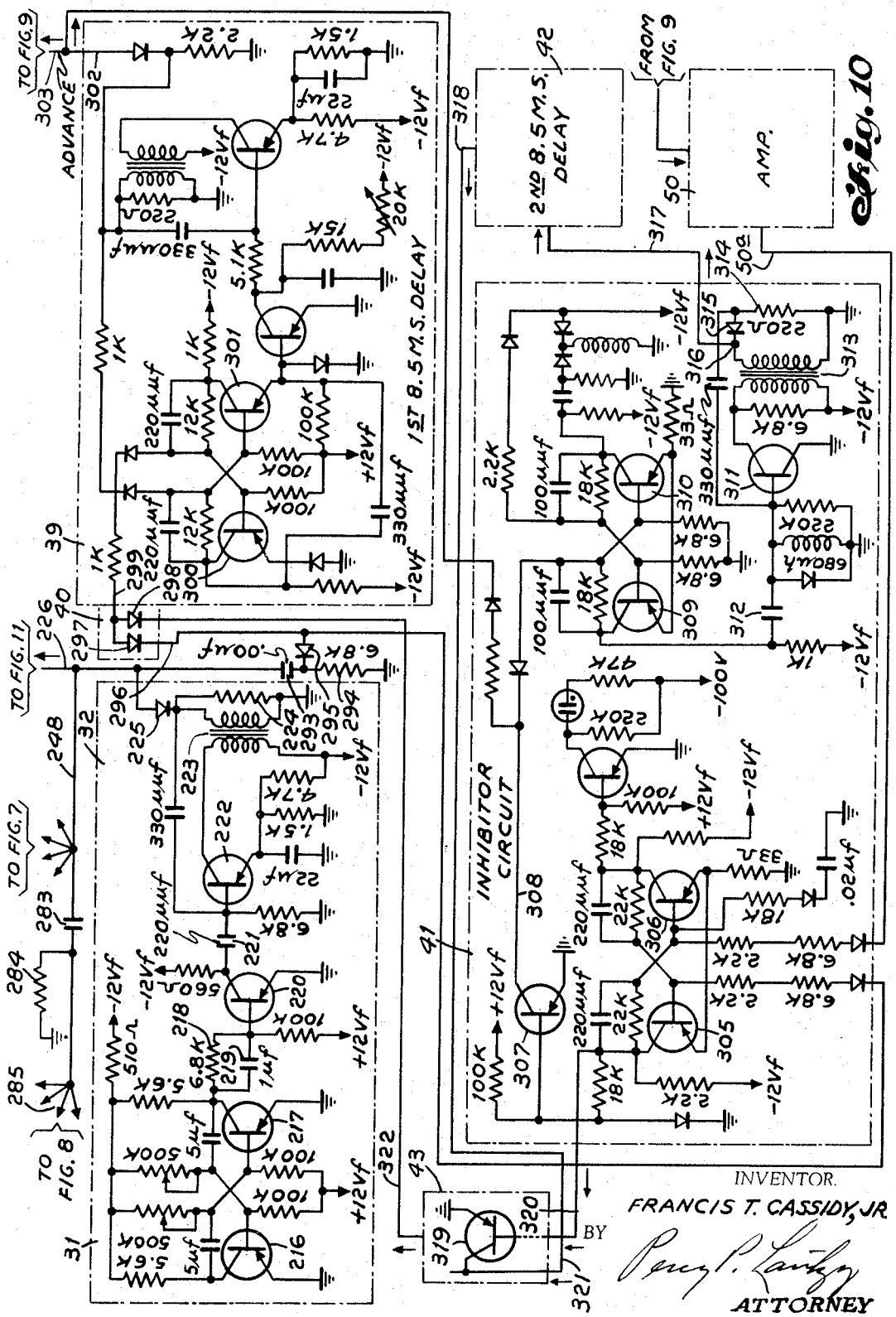
FIGURE 10 is a circuit diagram of the high speed cycling circuit at the transmitting station for controlling the advance of the block shift register.

In carrying out the invention, signals representing one character as received from each subchannel are arranged in a sequence block, minus the "start" and "stop" units of each. Then a "start" signal is inserted at the head of the sequence block and this block with its "start" signal is transmitted over the transmission channel to the receiving station. At the receiving station, when the block of signals has been received, the groups of intelligence units are separated and supplied with individual "start" signals and then sent seriatim over their respective subchannels. The signal blocks are transmitted at regular intervals independent of the incoming signals from the subchannels and may or may not contain the subchannel characters depending on whether or not they have been received before the block transmission starts.

In order to accomplish the arranging and rearranging of the signal units, shift registers are used. Each subchannel is provided with a series-to-parallel shift register adapted to hold all the signal units for one character including the "start" and "stop" signals. When the complete character has been received from a subchannel, the intelligence signal units, with the "start" and "stop" signals omitted are simultaneously transferred to a buffer storage register. From the buffer storage register the signals are simultaneously transferred to one section of a block shift register which has a section for each subchannel. A "start" signal is then inserted as a first signal in the block and the entire block transmitted at a higher speed to the receiving station. Another block shift register at the receiving station receives the block signals, and when this register is completely filled, the signals in individual sections are simultaneously transferred to individual parallel-to-series shift registers from which the signals are sent to their respective subchannels at the normal speed.

The operation of the system will first be described in general in connection with the block diagrams of FIGURES 1 and 2 and then the detailed explanation of the circuits will be given.

GENERAL DESCRIPTION

Referring now to FIGURE 1, the circuitry of the transmitting station has been indicated in block form. The particular example illustrated has four ¼-speed subchannels with input circuits 1, 2, 3, and 4. These input circuits are provided respectively with buffer storage circuits 5, 6, 7, and 8. A control circuit 9 and a block shift register 10 are common to all the subchannels.

Since the subchannel input circuits and the buffer storage circuits are identical, those associated with subchannel 1 have been shown more in detail, while those for the other subchannels have merely been shown as rectangles.

The input circuit of subchannel 1 comprises a series-to-parallel shift register 11 which has a stage for each signal unit of a character to be transmitted. For the particular system chosen for illustration, there are seven signal units for each character: a "start" unit, five intelligence units, and a "stop" unit. Therefore, there are seven stages in the series-to-parallel shift register 11.

This shift register may be of any suitable type, as long as signals may be fed into it in series and the contents of the stages may be removed simultaneously.

A feature of the invention is to provide a subchannel input circuit which will receive any type of telegraph signals with very minor adjustments and will discriminate between the character signals and those of less than 2 milliseconds duration. For this purpose a solid-state relay 12 is provided which will receive either neutral or polarized signals of either polarity and produce a negative voltage level on the "space" output 13 and a positive voltage level on the "mark" output 14 when a "space" is received and the opposite polarities when a "mark" is received.

The "start" signal is a "space," and hence when any character is received by the solid-state relay 12, a negative voltage level first appears on the lead 13 and a positive level on the lead 14. The negative level is integrated by the integrator 15 and differentiated by the differentiator 16 and delivered through an "OR" gate 17 to trigger a first 10 millisecond delay circuit 18 which produces a negative pulse at the end of 10 milliseconds. This pulse is delivered through an inhibitor gate 19 to the input stage 20 of the series-to-parallel shift register 11. The inhibitor gate 19 will pass this pulse as long as there is a positive potential on the "mark" lead 14. If a "mark" signal produces a negative level on this lead, it is integrated by an integrator 21 and delivered to the inhibiting input of the inhibitor gate 19. Here it has the effect of blocking the passage of a pulse from the first 10 millisecond delay circuit.

The negative pulse in response to the "space" signal, as has been stated, can pass through the inhibitor gate so that it can set the input stage 20 of the shift register 11 to which it is applied.

It is now necessary to cause the series-to-parallel shift register to take one step to permit the next signal unit to be received. The output from the first 10 millisecond delay circuit 18 is also fed through an inhibitor circuit 22 to trigger a second 10 millisecond delay circuit 23. The inhibitor circuit 22 has been operated to pass the pulse from the first 10 millisecond delay circuit 18 by the output of the "OR" gate 17 in response to the "space" signal over the lead 13. Once operated by this "space" signal, the inhibitor will remain in the operated condition to pass pulses until the condition is changed in a manner to be described.

The second 10 millisecond delay circuit 23 will now produce a pulse 10 milliseconds later which will be delivered to trigger the first 10 millisecond delay 18 again through the "OR" gate 17. At the same time, the pulse is also delivered to the series-to-parallel shift register 11 to advance the information set up in all stages one stage towards the right.

The two 10 millisecond delay circuits 18 and 23 will now maintain a cycling action, independent of the incoming signals and producing a pulse from the second one which will advance the register every twenty milliseconds. This timing is set to agree with the timing at which the character signal units are received by the solid-state relay, but in each case the advance takes places after the signal unit has been received and sampled.

If the signal unit is a "space," the inhibitor gate 19 is set to pass the signal to set it up in the input stage 20 of the shift register. However, if the signal unit is a "mark," the inhibitor gate 19 will be set to block the signal coming from the first 10 millisecond delay circuit 18 and no change will take place in the input stage 20, indicating a "mark."

After six steps have been taken, the signal units for the entire character will be set up in the register 11. As soon as the "space" signal representing "start" reaches the last stage 24 to the right of the register, a negative level will appear on its output and will be differentiated by differentiator 25, and the negative pulse thus produced will be amplified in the amplifier 26 and delivered as a transfer pulse to the buffer storage circuit 5. At the same time, the pulse from the amplifier 26 will be delivered to the inhibitor circuit 22 which will change its condition to stop any pulses from the first 10 millisecond delay circuit 18 from passing through it. Thus the cycling of the timing circuit will be stopped. At the same time the pulse from the amplifier 26 will start a 4 millisecond delay 27.

Meanwhile the transfer pulse from the amplifier 26 passes through a differentiator and amplifier 28 in the buffer storage circuit 5 and will enable the stages of the buffer register 29 to receive the settings of the corresponding stages of the series-to-parallel shift register 11. Therefore the instant that the series-to-parallel shift register is filled by a complete character, the transfer pulse causes the transfer of the five intelligence signal units to the buffer storage register.

It will be noted that the buffer storage register has only five storage elements, or, in other words, has only that number of storage elements which corresponds to the number of intelligence signal units between the "start" and "stop" units. Thus when the transfer takes place, the "start" and "stop" units of the character are dropped and only the five intelligence units will be transferred.

The 4 millisecond delay 27 in the input circuit 1 which was triggered by the pulse from the amplifier 26 produces a pulse after 4 milliseconds which is delivered to the series-to-parallel register 11 to reset it to normal condition after which it is ready to receive the next character from subchannel 1.

The next step is the transfer of the information in the buffer storage register 29 to the first section 30 of the block shift register 10, and the transfer of information in the other buffer storage registers associated with subchannels 2, 3 and 4. This is accomplished by means of certain circuitry in each of the buffer storage circuits 5 to 8 under control of the control circuit 9.

This control circuit 9 provides the means for timing the transmission of the block of intelligence units consisting of five intelligence units from each of the subchannels. The heart of the control circuit 9 is an astable flip-flop circuit 31 which is designed to oscillate independently of the incoming signals at a frequency equal to or a little less than the fastest rate at which the characters are received. In other words, the time of one cycle of the flip-flop is equal to or a little less than the time between the "start" signal of one character and the "start" signal of the next character received over the solid-state relay 12 from the subchannel having the fastest character modulation rate.

The square wave from the flip-flop 31 is fed into a pulse generator 32 and the negative pulse from this generator is directed to all of the buffer storage circuits 5 to 8 and to the block shift register 10 in a manner which will now be described.

In the buffer storage circuit 5, the transfer pulse from the transfer amplifier 28, besides effecting the transfer of the information from the series-to-parallel shift register 11, also operates an inhibitor 33 to permit it to pass pulses which are normally blocked. A pulse from the pulse generator 32 then passes through the inhibitor 33 and through the "OR" gate 34 to a pulse-forming circuit 35 and the output from this circuit is amplified in the amplifier 36 which then delivers a transfer pulse to the first section of the block shift register 10. This transfer pulse, indicated on the drawing as "transfer #2," enables the first section and therefore effects the transfer of the intelligence which is in the buffer storage register over individual leads to the correponding stages of the block shift register.

This same procedure of shifting takes place with respect to each subchannel buffer storage circuit as long as there is information stored in the storage register of that subchannel.

At the same time the pulse from the pulse generator 32 is fed to a pulse forming circuit 37 where the width is adjusted and the pulse is then amplified by the amplifier 38 and fed to the very first stage of the block shift register 10. This pulse is fed over a lead, indicated on the drawing as "transfer #1," and enables the first stage to receive a negative potential which has the effect of inserting a "space" signal into the first stage. Since the "start" signal is a "space," this has the effect of inserting the "start" signal into the block shift register.

Assuming that intelligence has been transferred from each subchannel, the five intelligence units from each subchannel are now set up in the block shift register, together with a "start" signal for the entire block. It is now necessary to advance the block shift register in order to shift the entire block out seriatim over the line towards the receiving station. This is done at a greater speed than the characters are received from the subchannels in order that the block shift register may be empty when the next characters from the subchannels are ready to be transferred into it.

A cycling circuit is provided for producing pulses to advance the block shift register. The operation of this cycling circuit will now be described.

The pulse from the pulse generator 32 is fed to trigger a first 8.5 millisecond delay circuit 39 through an "OR" gate 40 and the output of the first delay circuit is fed to the "advance" lead of the block shift register to cause the information therein to advance one stage. The output of the first 8.5 millisecond delay circuit is also fed through an inhibitor circuit 41 to trigger a second 8.5 millisecond delay circuit 42. The inhibitor circuit would normally prevent the pulse passing between the two delay circuits, but it has been operated by a pulse from the pulse generator 32 and will remain in the operated condition until it is reset in a manner to be explained.

The pulse from the inhibitor circuit 41 also opens the inhibitor gate 43, so that the delayed pulse from the second 8.5 millisecond delay circuit 42 may pass through it and through the "OR" gate 40 and trigger the first 8.5 millisecond delay circuit again. As long as the inhibitor circuit 41 is set to pass pulses, the two delay circuits will cycle and each time a pulse is produced by the first delay circuit 39, the block shift register will advance. In this manner the entire block of signal units consisting of a "start" signal unit and four groups of five intelligence signal units each from the different subchannels will be transmitted out of the block shift register at high speed for transmission over the line.

The system is arranged so that no synchronization of the subchannel circuits is necessary. Characters may therefore be received by the different subchannels at slightly different times, and it may happen that one or more of the sections of the block shift register have been set before the others are ready to transfer the information to the block shift register. The block shift register does not have to wait until all the information from the subchannels has been received. As long as the information from one of them has been transferred, it may be advanced. This is accomplished in the following manner:

The inhibitor circuit 33 in each buffer storage circuit, when operated by the transfer signal, produces a voltage which will close an inhibitor gate 44 and prevent a pulse from the pulse generator 32 from passing through it. However, when no transfer signal has been received, this inhibitor gate is open and therefore the pulse from the pulse generator 32 can pass through it and will be applied to the "blanking" lead 45, which when energized by a negative potential will set all the stages of the associated section of the block shift register to a "mark" condition. The pulse passing through the inhibitor gate 44 is also applied to the "OR" gate 34, so that it will also energize the transfer lead.

With this arrangement, as long as one subchannel has received a character and it has been transferred to the associated buffer storage register, the block shift register will advance and deliver a block signal consisting of whatever subchannel information has been transferred, the rest being "space" signals.

The output lead 46 of the block shift register 10 delivers the block of sequence signals to an output solid-state relay 47 which is designed to transmit neutral or polarized signals of any polarity by suitable minor changes in the connections. The output of this solid-state relay is fed directly to the line 48 which leads to the receiving station.

If no signals have been received by any of the subchannel input circuits, there is no necessity of having the block shift register go through its advancing procedure. If all stages of the block shift register are registering "mark," therefore, "AND" gate 49 produces a negative level which is differentiated and amplified by the differentiator and amplifier 50 and delivered to the inhibitor circuit 41 in such a manner as to block the passage of pulses therethrough. Since this inhibitor is between the two 8.5 millisecond delay circuits 39 and 42, the cycling is stopped and no further advance of the block shift register is permitted before the next pulse from the pulse generator 32.

Having sent the block of signals over the line 48, it is now necessary for the receiving station to receive the entire block and distribute the individual groups of intelligence signals to their proper subchannels where they are to be introduced as sequences of character signal units.

The receiving station has been shown in FIGURE 2. It comprises a control circuit 51, a block shift register 52, and individual subchannel output circuits 53, 54, 55, and 56. Since the output circuits are identical, only circuit 53 for subchannel 4 has been shown in greater detail.

The receiving end of the transmission line 48 is connected to a solid-state relay 57 which may be similar to the solid-state relays 12 in the subchannel input circuits of the transmitter. It is adjusted to receive the type of signals transmitted by the transmitting station. The "start" signal, which is a "space," produces a negative level on the "space" lead 58 which is integrated and differentiated by the circuit 59 and fed to the first inhibitor gate 60. This inhibitor gate is normally set to permit pulses to pass. However, the same pulse from circuits 59 is delivered to an inhibitor circuit 61 which is thereby operated and produces a voltage on the lead 62 which blocks the first inhibitor gate 60 to prevent any other "space" signals in the incoming block of signals from passing through it.

From the first inhibitor gate 60 the pulse passes through an "OR" gate 63 to trigger a first 8.5 millisecond delay circuit 64. After a delay of 8.5 milliseconds, the delay circuit 64 produces a negative level which passes through the second inhibitor gate 65 and sets up the input stage of the block shift register 52. This stage is actually the number 5 stage of the fourth section of block shift register, since the advance is from the left to the right. The second inhibitor gate 65 is open to pass this signal as long as "space" is being received by the solid-state relay 57. If a "mark" is received, there will be a negative potential on the "mark" lead 66 which will close the inhibitor gate 65 to prevent the output of the delay circuit 64 from reaching the block shift register.

The output from the first delay circuit 64 also passes through the inhibitor circuit 61 which has been operated to permit the passage thereof by the "space" signal from the solid-state relay 57 and triggers a second 8.5 millisecond delay circuit 67. At the end of an interval of 8.5 milliseconds, the delay circuit 67 will produce a negative level that is delivered to the "advance" lead 68 for the block shift register. The register will advance one stage.

The output of the second delay circuit 67 is also delivered through a third inhibitor gate 69 and through the "OR" gate 63 to trigger the first 8.5 millisecond delay circuit again. The inhibitor gate 69 is held open to pass the voltage from the second delay circuit 67 by the inhibitor circuit 61 which was operated by the incoming "start" signal.

The cycling of the two delay circuit 64 and 67 will then continue producing an "advance" pulse every 17 milliseconds to advance the block shift register. As each step is made another signal unit is introduced into the input stage. Whether the signal will be a "space" or a "mark" will depend on whether the inhibitor gate 65 is open or closed when delay circuit 64 produces its pulse and this will depend on the potential on the "mark" lead. This cycling continues until the block shift register has been filled.

When the "start" signal reaches the last stage at the right of section 1 of the block shift register 52, a negative voltage level will appear on the transfer lead 70 and this will be amplified by the amplifier 71 and delivered to the subchannel output circuits 53 to 56 to effect the transfer of the information in each section of the block shift register to the corresponding subchannel output circuit.

The signal from the amplifier 71 is also fed to a delay circuit 72 which, after a short delay, produces a negative pulse which is delivered to the reset lead 73 of the block shift register to reset all the stages thereof, so that it is ready to receive the next block of signals from the line.

Meanwhile, the information from the sections of the block shift register 52 is received by the respective subchannel output circuits 53 to 56 each of which is provided with a parallel-to-series shift register 74. In order to enable this register to receive the information from the block shift register, the transfer pulse from the amplifier 71 of the control circuit is delivered to an amplifier 75 in each output circuit from which it is delivered to the transfer lead of the associated register which has the effect of enabling all of the stages of the register. The first five stages on the left of this register are directly connected to the outputs of the five information stages of the associated section of the block shift register. The output circuit 53 is for the 4th subchannel, and the five information stages are connected to the five information stages of the fourth section of the block shift register which is shown on the extreme left of that register. The register 74 has seven stages. The five on the left are the information stages, while the next two are a "start" stage 76 and an output stage 77. The "start" stage is connected through a resistance 78 to a negative potential, indicated at 79. When this stage is enabled, a "start" signal is automatically set therein.

With the character set up in the parallel-to-series shift register, the shift register may now be advanced to send the signal units seriatim into the subchannel. The manner in which this is accomplished will now be explained.

The pulse from the amplifier 71 also passes through an amplifier 71a in the control circuit and is delivered to each output circuit where it is differentiated by a differentiator 80 from which a pulse passes through an "OR" gate 82 to trigger a first 10 millisecond delay circuit 83. At the end of ten milliseconds, a negative pulse is delivered to the "advance" lead 84 for the register 74, causing the information in the register to advance one stage. The negative pulse from the delay circuit 83 also triggers a second 10 millisecond delay circuit 85 which delivers a negative pulse to an inhibitor circuit 86. The inhibitor circuit has been operated to permit the passage of the pulse by means of the pulse from the amplifier 71a of the control circuit. This pulse is differentiated in the differentiator 87 and fed to the inhibitor circuit 86 where it effects the operation of the circuit which will remain so operated until it is shut off in a manner to be described.

The pulse from the delay circuit 85, after passing through the inhibitor circuit, passes through the "OR" gate 82 and triggers the first 10 millisecond delay circuit 83 again. Thus the two delay circuits 83 and 85 will continue to cycle, and at each cycle, an "advance" pulse is produced by the first delay circuit 83 which will advance the shift register 74.

The signals representing the character units are thus fed seriatim out of the shift register 74 over the output lead 88 to the solid-state output relay 89 from which they are delivered to the associated subchannel, indicated at 90.

When the register 74 is empty and all the character units have been fed to the subchannel, it is necessary to stop the cycling of the two delay circuits 83 and 85. This is accomplished by means of an "AND" gate 91 whose seven inputs are connected to the seven stages of the register 74. When the register is empty, all seven stages will be in the "mark" condition, and this will produce voltages which will operate the "AND" gate 91 which in turn will produce a pulse which will shut off the inhibitor circuit 86 and cause it to prevent a pulse from travelling between the two delay circuits 83 and 85, so that the cycling is stopped.

If, when the information is transferred from the associated section of the block shift register 52 to the register 74, all the five signals are "zero" or, in other words, "spaces," which represents a blank, then the register is immediately reset. This is accomplished by means of an "AND" gate 92 with five inputs which are connected to the five information stages of the register 74. When these stages are all in the "space" condition, the gate will operate and deliver a pulse to a "blank detect amplifier" 93 which, in turn, feeds a pulse over a reset lead 94 to the register 74 which is thus reset to its normal condition.

FIGURES 3A, 3B, and 3C are timing charts which show different combinations of subchannel transmitting speeds. An inspection of these figures will show that the transmission of the block of characters as indicated on the line labelled "output," is independent of the timing of the receipt of the characters from the subchannels. The waveforms of FIG. 3 represent voltage waveforms in the vertical direction plotted against the horizontal time axis.

FIGURE 3A indicates the timing when four ¼-speed subchannels are used. The upper line represents the pulse produced by the pulse generator 32 under control of the astable flip-flop 31. The second line from the top gives the time at which the tape clutch operates at subchannel No. 1 to send the signals representing one character into the input circuit 1. The third line represents the signal from subchannel No. 1. The clutch operation time and the signals from subchannels No. 2, 3, and 4 follow successively. The bottom line represents the output from the transmitting station and shows the block of the combined signals from all the subchannels which flows out of the block shift register 10.

It will be noted that between the first and second pulses of the pulse generator 32, signals from the first two subchannels have been received. However, when the second pulse occurs to start the block shift register, the third subchannel signal character has not been completed and the fourth subchannel signal has not yet started. Therefore the block signal will contain only the signals from the first two subchannels, the units representing the third and fourth subchannels being all "marks." The signals from the third and fourth subchannels will be transferred to the block register before the next pulse from the pulse generator, and therefore the next block to be transmitted will contain these characters as well as the next character from subchannel No. 1.

It makes no difference when the signals representing a character from a subchannel come in as long as the character is completed at some time between two successive pulses from the pulse generator. As soon as it is completed it will be transferred to the buffer register associated with that subchannel and as soon as the block shift register is empty it will be transferred from the buffer register to the block shift register and the block shift register will transmit it in response to the next pulse from the pulse generator.

In FIGURE 3B the timing is shown for two ¼-speed subchannels and one ½-speed subchannel. Again it will be seen that the pulse which controls the output, indicated on the last line, is independent of the incoming signals from the three subchannels. The output will contain any character from the three subchannels which has been completely received before the pulse is produced which initiates the output.

FIGURE 3C illustrates the timing of two ½-speed subchannels and the same situation with respect to the relation between the pulse which controls the output and the time of the incoming characters from the subchannels obtains. As long as only one character from each subchannel is completed between every two of the generator pulses, the output will contain that character.

Because of this timing arrangement, the circuits which control the transmission of characters from the subchannels into the transmitting station need not be accurately timed, nor do they need to be synchronized with each other. This permits the use of inexpensive timing equipment and makes the system extremely flexible. In addition, other codes and combinations of speeds may be used with suitable adjustments of the timing circuits and other connections.

DETAILED DESCRIPTION

Each subchannel circuit at the transmitting station includes an input circuit 1 with associated control circuits and a buffer storage circuit 5 also with its associated control circuits, while the control circuit 9 with its associated circuitry is common to all the subchannel circuits.

In FIGURES 4 to 16 the circuits of the invention have been shown in sufficient detail for an understanding of the operation of the circuits. FIGURES 4 and 11 are diagrams of the circuits at the transmitting station. The transmitting station circuits will be described first.

TRANSMITTING STATION

The solid-state input relay 12 is shown in FIGURE 4. The input leads are connected to a rectifier bridge 96 which, in turn is connected across the primary winding of a transformer 97. The rectifier bridge has the effect of causing a signal current to flow in one direction only through the primary winding regardless of whether the incoming signal is neutral or polar and regardless of the polarity. The secondary winding of the transformer is connected between ground and a point 98 on a voltage divider circuit 99 connected between 12 volts positive, indicated at 100, and 12 volts negative, indicated at 101. A resistor 102 and a capacitor 103 are connected in parallel across the secondary winding of such values as to prevent signals of less than two milliseconds from affecting the circuit.

The voltage divider circuit 99 provides suitable base voltage for two P-N-P transistors 104 and 105 to maintain them normally conductive. The base of the transistor 104 is connected to a point 106 on the voltage divider circuit and the base of the transistor 105 is connected to a point 107 on the voltage divider circuit. The emitters of both transistors are grounded. The arrangement is such that a voltage developed across the resistor 102 by a "space" signal from the input leads 95 will cause the bases of the transistors 104 and 105 to swing sufficiently negative to make the transistors conduct.

The solid-state relay 12 also includes a flip-flop circuit comprising two P-N-P transistors 108 and 109. The circuit for the transistor 108 is adjusted to maintain the transistor normally conducting, while that of the transistor 109 is adjusted for normally maintaining the transistor nonconducting. The base of the transistor 109 is coupled by suitable circuitry to the collector of the transistor 105 and when this transistor is turned off by an incoming "space" signal, its collector will swing negative and will cause the transistor 109 to be turned on. Another transistor 110 is connected between the base of the transistor 108 and the collector of the transistor 104. The circuit for the transistor 110 is adjusted so that the transistor is normally off. When the signal causes the transistor 104 to be shut off, its collector, swinging negatively, will turn on the transistor 110 whose collector will swing in the positive direction to effect the turning off of the transistor 108 whose base is coupled to the collector of the transistor 110.

An incoming "space" signal will therefore turn on the transistor 109 and shut off the transistor 108. The "space" lead 13 is connected to the collector of the transistor 108 and the "mark" lead 14 is connected to the collector of the transistor 109. Thus, whenever, a "space" signal is received, the lead 13 will have a negative voltage level on it and the lead 14 will have a positive voltage level on it. And whenever a "mark" signal is received, the lead 13 will have a positive voltage level on it and the lead 14 will have a negative voltage level on it.

The effect of the negative potential on the lead 13 is to set a "space" signal into the input stage of the series-to-parallel shift register 11 and to start the independent cycling circuit including the delay circuits 18 and 23. At the same time the positive level on lead 14 opens the inhibitor gate 19 to permit this setting to be made.

These functions are accomplished in the following manner: The negative level on the lead 13 is delivered to the integrator 15 comprising a resistor 111 in series with the lead and a capacitor 112 between the other end of the resistor and ground. The integrator feeds into the differentiator 16 comprising a capacitor 113 in series with the circuit and a resistor 114 connected between the other end of the capacitor and ground. A decoupling diode 114a suitably polarized to pass negative pulses and prevent feedback is also connected in series with the circuit. A lead 115 from the differentiator 16 delivers a negative pulse to a diode 116 of the "OR" gate 17, shown in FIGURE 5, whose second input comprises diode 117. The positive poles of the two diodes are connected together and by means of a lead 118 to the first 10 millisecond delay circuit 18. This negative pulse triggers the delay circuit. Also a lead 119 is connected from the output of the differentiator 16 to permit the operation of the cycling circuit in a manner to be described.

The first 10 millisecond delay circuit 18 of FIGURE 5 comprises a flip-flop circuit having transistors 120 and 121 connected in a known manner to permit them to remain stable with either one operated and the other one unoperated. The lead 118 is coupled to the base of the transistor 120 which, when the operation starts, is in the "off" or nonconducting condition. A negative "space" pulse applied to lead 118 turns transistor 120 on and transistor 121 off. A third transistor 122 has its base connected to the emitter of the transistor 121 which is also coupled to the collector of the transistor 120 by a coupling capacitor 123. The effect of this circuit, when transistor 120 turns on and transistor 121 turns off, is to deliver a positive pulse to the base of transistor 122 and turn it off. The collector of this transistor is connected to the delay circuit which acts to reverse the conditions of the transistors 120 and 121 after a predetermined time which in the example being described is 10 milliseconds. This delay is accomplished in the following manner. The emitter of the transistor 122 is connected to ground, while the collector is connected to 12 volts negative potential over series resistors 125 and 126, the latter being adjustable. A capacitor 127 is shunted to ground across these resistors. The transistor 122 is normally on, and in this condition, the capacitor 127 is in a discharged state, both terminals being grounded. When, however, the transistor 122 is shut off by the action of the flip-flop 120–121, the capacitor 127 starts to charge in a circuit from 12 volts negative, resistors 126 and 127, and the capacitor to ground. The ungrounded side of the capacitor is coupled to the base of another transistor 128 which is normally off. After 10 milliseconds, the ungrounded side of the capacitor 127 becomes sufficiently negative to cause the transistor 128 to become conductive. The collector of this transistor is connected to one end of the primary winding of a transformer 129, the other end of the winding being connected to 12 volts negative. The turning on of the transistor 128 causes a surge of current through the primary of the transformer 129 which sets up a surge in the secondary winding across which is connected a resistor 130. The potential at one end of this resistor is thus caused to swing in a negative direction, and this end of the resistor is coupled back through a resistor 131 and a diode 132, poled to permit the passage of a negative pulse, to the base of the transistor 121 to turn on this transistor again and therefore to turn off the transistor 120. Thus the flip-flop is restored to its normal condition after 10 milliseconds.

At the same time the negative pulse from the secondary winding of the transformer 129 passes through a diode 133 and is delivered over lead 134 to the inhibitor gate 19 of FIGURE 4, and through this gate, in a manner to be described, over lead 135 to the series-to-parallel shift register to enter the "start" or "space" signal therein in a manner to be described.

The same pulse from the secondary winding of the transformer 129 of the delay circuit 18 is also delivered over the lead 136 to the inhibitor circuit 22. This inhibitor circuit comprises a pair of P-N-P transistors 137 and 138 connected in a flip-flop circuit with the lead 136 connected to the base of the transistor 138 through a decoupling diode 138a poled to permit the negative pulse to drive the base negative. The circuit parameters are such as normally to maintain the transistor 137 on and the transistor 138 off.

A transistor 139 is used to permit the negative pulse to reach the transistor 138 only if the "space" pulse has been received. To this end, a second pair of P-N-P transistors 140 and 141 are connected in a flip-flop circuit with the circuit parameters being such that the transistor 140 is normally off and the transistor 141 on. The lead 119 from the differentiator circuit 16 of FIGURE 4 is connected to the base of transistor 140 over a suitably poled diode 142 and resistors 143 and 144. A negative potential over lead 119, as a result of a "space" signal being received, will turn on the transistor 140 and turn off the transistor 141. When the flip-flop 140–141 is shifted by the pulse over lead 119, the circuit is such that it will remain in this shifted condition until shifted back again in a manner to be later described.

The base of the transistor 139 is connected to the collector of the transistor 140 over a resistor 145. The transistor 139 has its emitter grounded and its collector connected to the lead 136. The circuit connections for the transistor 139 are such as normally to maintain the transistor on. When the transistor is in this condition, the lead 136 is shorted to ground through the collector-emitter circuit of the transistor. When the flip-flop 140–141, however, changes its condition to turn the transistor 140 on, the potential of the collector swings in the positive direction, thus shutting off the transistor 139 and opening the short circuit. With the short circuit thus removed from the lead 136, the negative pulse is permitted to affect the transistor 138 so as to turn it on.

A visual indication of the operation of the flip-flop 140–141 is provided by means of another P-N-P transistor 146 whose base is connected in a suitable circuit to the collector of the transistor 141. When the transistor 141 turns off by the operation of the flip-flop, its collector becomes more negative and the transistor 146 comes on. A neon lamp 147 is connected between a negative potential of 100 volts and the collector of the transistor 146. The emitter of the transistor 146 is grounded. When this transistor comes on, current flows through the neon lamp 147 in the collector-emitter circuit and the lamp is illuminated.

When the flip-flop 137–138 is shifted by the pulse from delay circuit 18, the potential of the collector of the transistor 137 swings in the negative direction, and this turns on a transistor 148 whose base is connected to the collector of the transistor 137 over a coupling capacitor 149. The primary winding of a transformer 150 is connected between the grounded emitter and the collector of the transistor 148, and the secondary winding of this transformer 150 is connected across a resistor 151 in series with a diode 152. When the transistor 148 is turned on, current flows through the primary of the transformer 150 which produces a surge of current in the secondary winding. The diode permits the current to flow in one direction only and the polarity of connections is such that a point 153 at one end of the secondary winding swings negative when the transistor 148 is turned on. This point is connected over a lead 154 to the second 10 millisecond delay circuit 23, also of FIGURE 5, to trigger this delay circuit.

The flip-flop 137–138 is automatically restored to its normal condition after having been shifted by a pulse over lead 136 by means of a choke 137a one end of which is coupled to the collector of the transistor 138 over a capacitor 139a, the other end of the choke being connected to ground. When the transistor 138 is turned on, its collector becomes positive which sends a positive pulse through the choke to charge it. At the end of this pulse a negative pulse from the choke passes through diodes 140a and 141a and a resistor 142a to be applied to the base of transistor 137 to reset the flip-flop.

The delay circuit 23 is identical with the delay circuit 18 and hence has not been shown in detail. The lead 154 is connected to the base of the second transistor of the flip-flop circuit. The lead 155 is the output lead from this delay circuit and corresponds to the lead 136 from the delay circuit 18. A negative pulse appears on this lead at a time 10 milliseconds after the circuit is triggered by a pulse on lead 154. This pulse is delivered to one input, represented by the diode 117, of the "OR" gate 17 over lead 156, the output of this gate, as has already been stated, being connected over lead 118 to trigger the first delay circuit 18 again.

As long as the inhibitor circuit 22 remains in the condition to which it has been set by the "space" pulse, the delay circuits 18 and 22 will continue to cycle, first one delay circuit producing a pulse and then 10 milliseconds later the second one producing a pulse.

The first negative pulse from the delay circuit 18, as has been explained, passes over the lead 134 to the inhibitor gate 19 of FIGURE 4. This gate comprises a P-N-P transistor 157 whose emitter is connected to ground. The lead 134 is connected through a suitable diode 158 and resistor 159 to the collector of the transistor, and the output lead 135, which is connected to the input of the series-to-parallel shift register 11, is also connected to the collector. The base of the transistor 157 is connected over a resistor 160 to the integrator 21 which comprises a resistor 161 and a capacitor 162 between the output end of the resistor and ground. The circuit connections are such as to maintain the transistor on.

At the same time that the negative "space" potential level representing the "start" unit, is being produced over the lead 13 from solid-state relay 12, a positive potential level is being produced on the lead 14 from the relay 12. This positive level is integrated in the integrator 21 and drives the base of the transistor 157 in the positive direction to turn off the transistor. With the transistor 157 on, as it normally is, any negative pulse on the lead 134 will be shorted to ground. However, when the transistor 157 is turned off, this short circuit is removed and the negative pulse passes on over the lead 135 to the series-to-parallel shift register 11.

Each time a "space" signal is received, therefore, the transistor 157 is turned off to permit the negative level from the delay circuit 18 to influence the register, while each time a "mark" signal is received, the transistor 157 is turned on and the negative pulse from lead 134 is shorted to ground and prevented from influencing the register.

The operation of the series-to-parallel shift register will now be described. This is shown at the bottom of FIGURE 6 and it comprises, in the example being illustrated, seven identical register stages labelled from right to left "start," "1," "2," "3," "4," "5," and "stop." Only the "stop" stage 20 which is the input stage has been shown in detail, while the others have been merely represented by rectangles. The series of signals representing the character units are fed into the input stage 20 over the lead 135, as has already been explained. The stage 20 comprises a pair of P-N-P transistors 163 and 164 connected as a flip-flop circuit. The input lead 135 is connected over a resistor 165 and a diode 166 to the base of the transistor 163, and a negative pulse over this lead turns transistor 163 on and transistor 164 off. A visual indication of this operation is provided by means of a neon lamp 166 which is connected in the emitter-collector circuit of a P-N-P transistor 167 whose base is coupled to the collector of the transistor 164. When this transistor goes off, the collector is driven negative which turns on the transistor 167 and lights the lamp 166.

The "advance" pulse which causes the information stored in one stage of the register to be transferred to the next adjacent stage comes from the second 10 millisecond delay circuit 23 over a lead 168 connected to the output lead 155 of the delay circuit 23 of FIGURE 5. It is coupled to the bases of all the transistors corresponding to transistor 164 in all the stages of the register 11. This coupling is through an isolating diode 169, poled to admit the negative pulse and then to all the bases of the second transistors of the flip-flops through individual resistors 170 and diodes 171.

If stage 20 is registering a "mark," then transistor 164 will be on and the "advance" pulse over lead 135 will have no affect on it. The corresponding transistor in the next adjacent stage will be turned on if it is in the other condition. If stage 20 is registering a "space," then transistor 164 will be off and the "advance" pulse being applied to its base will turn it on. This will drive the collector in the positive direction and send a positive pulse over a coupling capacitor 172, through a diode 173, and to ground through a choke 174. The diode 173 is poled to pass this positive pulse. Upon the choke being thus charged, it produces a negative pulse shortly after the "advance" pulse ceases, and this negative pulse passes through a diode 175, poled to pass it, and is applied to the base of the first transistor corresponding to transistor 163 in the next adjacent stage. This turns the first transistor on regardless of what the "advance" pulse has done to it. Thus the "space" which has been registered in stage 20 has now been shifted to the next stage. The same effect is produced in each stage by the preceeding stage.

In recapitulation, a "space" pulse, indicating a "start" signal, will operate the inhibitor circuit 22 to permit pulses to pass through it, and will trigger the first 10 millisecond delay circuit 18. At the same time the positive potential on the lead 14 will open the inhibitor gate 19 to permit a pulse from the delay circuit 18 when it occurs, to set the input stage 20 of the series-to-parallel register 11. The pulse from the delay circuit 18 will then pass through the inhibitor circuit 22 and trigger the delay circuit 23, and a pulse from the latter will again trigger the delay circuit 18. Thus, the two delay circuits continue to cycle and produce a succession of pulses which are independent of the incoming signal units but are timed substantially to coincide with them. If the incoming signal is a "space," the inhibitor gate 19 is open to permit a pulse from the delay circuit 18 to set the input stage 20 of the series-to-parallel register 11. If the coming signal is a "mark," the inhibitor gate 19 is closed, and while the cycling of the delay circuits is not interrupted, the pulse from the delay circuit 18 is prevented from reaching the input stage 20 of the register 11, thus in effect registering a "mark" therein. In this manner an entire character, having a "start" unit, five intelligence units, and a "stop" unit, is fed into the register 11 and moves step-by-step from left to right as shown in the figure, until the "space" signal for the "start" unit reaches the "start" stage, shown at the extreme right of the figure. When the register is thus filled with the units of a character, there will be a "space" in the flip-flop of the "start" stage and the right transistor of the flip-flop will be off. This will cause the collector of that transistor to become negative, and thus a negative potential level will appear on a lead 176 connected to the collector. This lead is connected to the differentiator 25 comprising a capacitor 177 and a resistor 178, and the differentiated level is delivered to an amplifier 26 comprising two P-N-P transistors 179 and 180 connected in tandem. The circuit parameters are such that the transistor 179 is normally off and the transistor 180 is normally on. The impulse from the differentiator 25 is applied to the base of the transistor 179 and turns it on. The potential of its collector is thus swung in the positive direction and it is coupled to the base of the transistor 180 so that it turns that transistor off. A negative pulse will then appear on the collector of that transistor to which lead 181 is connected.

The negative pulse on this lead 181 is used for several purposes. It provides a "transfer" pulse on lead 182 for transferring the information stored in the series-to-parallel shift register 11 into the buffer register 29, shown in FIGURE 7. It also acts to restore the inhibitor 22 of FIGURE 5 to its normal condition over a lead 183 to stop the cycling operation. Also, over a lead 184, it triggers the 4 millisecond delay circuit 27 which acts to return the series-to-parallel register to its normal condition.

The lead 183 to the inhibitor circuit 22 of FIGURE 5 is fed through a diode 185 and resistors 186 and 187 to the base of the transistor 141. This shifts the flip-flop 140–141 back to its normal condition with transistor 141 on and transistor 140 off so that it is ready for the next character. The negative potential which thus appears on the collector of the latter transistor turns transistor 139 on and provides a shunt to ground for any signal appearing on lead 136 from the first 10 millisecond delay circuit 18, so that the second delay circuit 23 cannot be triggered and the cycling is thus stopped.

The transfer to the buffer register 29 will now be explained. The buffer register is shown in FIGURE 7 and comprises five register stages which are numbered 1 to 5. Five stages only are needed, since only the intelligence units are transferred. These stages are identical and only stage 5 has been shown in detail, the others being represented by rectangles.

A pair of transistors 188 and 189 are arranged in a bistable flip-flop circuit. The base of the right transistor 189 is connected over a lead 190 to the corresponding output lead 190 of the series-to-parallel register 11 of FIGURE 6, which lead is connected to the collector of the right flip-flop transistor 191 in stage 5 of that register. Similarly, the transistor 188 of the buffer register 29 has its base connected by means of lead 192 to the corresponding lead 192 of the series-to-parallel register 11 which is connected to the collector of the left transistor 193 of stage 5. The bases of the other transistors in the other stages of the buffer register 29 are connected to the collectors of transistors in the other stages of the series-to-parallel register 11 in a corresponding manner, as indicated by the brackets and the single cable 194 extending between these two circuits.

Any potentials on the collectors of the transistors in the series-to-parallel register 11 would normally appear on the bases of the opposite transistors in the buffer register 29 to which they are connected. However, these potentials are only permitted to affect the transistors of the buffer register 29 at the moment of the transfer pulse from the amplifier 26, and this is accomplished in the following manner:

The input lead 192 of the buffer register 29 includes a resistor 195 and a diode 196 which is between the resistor and the base of the transistor 188 and is poled to pass a negative potential. Similarly, the lead 190 includes a resistor 197 and a diode 198. The input leads to all of the other stages contain similar resistors and diodes. Between the resistor 195 and the diode 196, a lead 199 is connected, containing a diode 200, poled to pass current towards the lead 192. A similar lead 201 containing a similarly poled diode 202 is connected between the resistor 197 and the diode 198 of the lead 190. The input leads of all the stages have similar individual leads containing diodes connected to them. The other terminals of all of the diodes of these individual leads are connected to a common transfer lead 203.

Normally a positive potential is maintained on this lead in a manner to be described. This causes a positive potential to be maintained on each of the leads 190 and 192 of stage 5 and the corresponding leads of the other stages with the result that any negative potentials on the output leads of the series-to-parallel register 11 will not affect the transistors in the buffer register. However when a transfer pulse occurs, the common lead 203 is caused to become negative in a manner to be described, whereupon the diodes 200 and 202 in stage 5 and the corresponding diodes in the other stages are blocked and the potentials in the output leads of the series-to-parallel register 11 are transferred to the bases of the transistors of the different stages in the buffer register and each stage assumes the opposite condition to that of the corresponding stage of the series-to-parallel register.

The lead 203 in the buffer register 29 is energized in the following manner: The negative transfer pulse from the output lead 181 of the amplifier 26 of FIGURE 6 is delivered to the lead 182 which is connected to the input of a transfer amplifier 28, shown in FIGURE 7. The pulse is fed over a suitable coupling circuit to the base of a transistor 204 whose emitter is connected to ground and whose collector is connected to the base of a second transistor 205. The collector of this second transistor is connected by means of a lead 206 to the lead 203. The circuitry of the amplifier is such that the transistor 204 is normally off and the transistor 205 is normally on. When the latter transistor is on, positive potential from a source of 12 volts, indicated at 207, is connected over a low value resistor 208 and the emitter-collector circuit of the transistor 205 to the common lead 203, so that none of the stages of the buffer register 20 can receive information from the series-to-parallel register 11. When the negative transfer pulse appears on the lead 182 from the amplifier 26, the transistor 204 is turned on and the transistor 205 off and an amplified negative pulse appears on the lead 203 which enables all of the stages of the buffer amplifier 29 simultaneously to receive the intelligence units from the series-to-parallel register 11.

As soon as the information has been transferred out of the series-to-parallel register, this register can be restored to normal in readiness to receive another character. This is accomplished by the 4 millisecond delay circuit 27 shown in FIGURE 6. This circuit is similar to the delay circuit 18 and need not be described in detail. The pulse from the amplifier 26 appearing on lead 181 is delivered over lead 184 to the base of the left transistor 184a of the flip-flop pair to trigger the flip-flop. An output lead 184b receives a negative pulse 4 milliseconds later which is delivered over a diode 184c to the advance lead of the series-to-parallel shift register 11. By this time the chokes, such as 174, which control the shifting of information in the register have all been discharged so that the negative pulse on the advance lead merely turns all the right transistors on and this restores the register to normal.

When the information has been transferred in the manner described to the five stages of the buffer register 29, it is necessary to transfer the information into the block shift register 10 which is shown in FIGURE 9. The block shift register 10 has a plurality of register stages which are divided into sections, there being one section for each subchannel. Since, in the example shown, there are four subchannels, there are four sections in the register 10, these sections being labelled accordingly. Each section has five stages, one for each of the storage register stages of the associated subchannel. In addition there are two other stages in the register: an "output" stage 209 and a "start" stage 210 adjacent the output stage. The two stages 209 and 210 are shown at the top of the figure; sections 1 and 2 are shown in the central part of the figure; while sections 3 and 4 are shown at the bottom of the figure. However, it will be understood that all of the stages are in a single sequence and that the shifting of the information to feed it out of the output stage is from left to right, as indicated by the arrows. The bases of all of the left transistors of the flip-flops of a section are coupled respectively to the collectors of the left transistor of the corresponding stages of the buffer register 29 of the associated subchannel. For example, the lead 211 in the fifth stage of section 1 which comes from the base of the left transistor is connected through suitable coupling to the collector of transistor 188 of the buffer register 29.

The bases of the right transistors of each pair do not need any connection, since these transistors are normally on, and if the corresponding stage of the buffer register contains a "mark," there is no need to change the stage of the block register.

The connections between the bases of the left transistors in section 1 of the block register and the buffer register of subchannel 1 are indicated by a bracket which is connected by a single lead 212. Similar connections from the buffer registers of subchannel 2, 3, and 4 are indicated by the respective brackets and single leads 213, 214, and 215.

Since only the five intelligence units from the subchannel buffer registers are to be transferred, it is necessary to insert a "start" signal in the "start" stage of the block register. The transferring of the intelligence units and the insertion of this "start" signal are performed simultaneously under control of the next pulse generated by the pulse generator 32 which is operated by the astable flip-flop circuit 31. This is accomplished in the following manner:

The astable flip-flop 31, shown in FIGURE 10, comprises a pair of P-N-P transistors 216 and 217 connected in a known circuit so as to produce a complete oscillation, shifting from one condition to the other and back to the first again, in a period of time equal to or less than the time between two adjacent "start" signals from a subchannel. A square wave, produced at the collector of the transistor 217 is fed over a coupling circuit comprising a resistor 218 shunted by a capacitor 219 to the base of a P-N-P amplifier transistor 220 whose emitter is connected to ground and whose collector is coupled over a capacitor 221 to the base of another P-N-P transistor 222. These last two transistors comprise the pulse-forming circuit 32. The primary winding of a transformer 223 is connected in the emitter-collector circuit of the transistor 222, and the secondary winding of this transformer is connected across a resistor 224 which has one end grounded. The other end of the resistor forms the output of the pulse-generating circuit and is connected over a diode 225 to a lead 226 which delivers the sharp pulse developed by the circuit 32 to the circuit 37, shown in FIGURE 11.

This circuit is primarily used for resetting the block shift register and produces a delayed pulse after sufficient time has elapsed for the block shift register to be emptied. It is similar to the delay circuits 18 and 23 and need not be described in detail. The pulse from the lead 226 is applied to the base of a P-N-P transistor 227 which is the left transistor of the flip-flop pair, the right one being indicated at 228. An output lead 229 is connected to the collector of the transistor 227. When the flip-flop is first shifted by the pulse on lead 226 the transistor 227 comes on and a positive potential level appears on the lead 229. This, however, has no effect on the amplifier 38 to which the lead is connected. When the circuit 37 returns to normal after the time delay, a negative level appears on the lead 229 and this acts on the circuit 38.

The circuit 38 comprises a P-N-P transistor 230 to the base of which the lead 229 is connected through a coupling capacitor 231. The transistor 230 is turned on by the negative pulse on its base and the positive potential which then appears on its collector is delivered to the base of a second transistor 232 to turn that transistor off, so that a negative potential appears on its collector. By means of a choke 233 connected in the collector circuit, a widened negative pulse appears on the lead 234 which is connected to the collector circuit. This lead is labelled "transfer #1" and is connected to the "start" stage of the block shift register 10 of FIGURE 9. The lead 234 is connected over a diode 235 to the junction of a resistor 236 and a diode 237 which are connected in series to the base of the left transistor 238 of the flip-flop pair for that stage, and the stage is enabled to receive a potential when a negative pulse appears on the lead 234 in the same manner as already described in connection with the transfer lead 203 of the buffer register 29. The other end of the resistor 236 is connected through another resistor 239 to a source 240 of negative potential.

When the pulse appears on the lead 234, the negative potential from the source 240 is applied to the base of the transistor 238, thus inserting a "start" signal in the "start" stage.

The transfer of the intelligence units from the four subchannel buffers registers is accomplished in the following manner: The transfer pulse from the amplifier 28 of FIGURE 7 is also delivered over a lead 241 to the inhibitor circuit 33, also of FIGURE 7. This circuit is similar to that of the inhibitor circuit 22 of FIGURE 5 and comprises a flip-flop pair of transistors 242 and 243 connected in the usual flip-flop circuit. The transistor 242 is normally off and the transistor 243 is normally on. The negative pulse on the lead 241 is delivered to the base of the transistor 242 and reverses the condition of the transistors. This drives the collector of the transistor 242 in the positive direction and thus shuts off a transistor 244 whose base is connected to that collector. The transistor 244 has its emitter grounded and its collector connected to a lead 245 which forms the input lead to a second pair of transistors 246 and 247 which are connected in a flip-flop circuit. The transistor 244 is normally on and provides a short circuit to ground for the lead 245 over its collector-emitter circuit. When this condition prevails, no signal can reach the flip-flop circuit 246-247 over the lead 245. With the transistor 244 off, the flip-flop 246-247 can be triggered.

The pulse from the pulse generator 32 of FIGURE 10 is delivered to a lead 248 which provides a connection to the inhibitor circuit 33 of each of the subchannel circuits. The negative pulse on this lead is differentiated by means of the capacitor 249 and the grounded resistor 250 and passes through a diode 251 and a resistor 252 to the lead 245 and then over a diode 252 to the base of the transistor 247 which is thus turned on while the other one 246 is turned off, these transistors normally being in the reverse condition.

When the transistor 246 is turned off, the negative pulse passes from its collector through a coupling capacitor 253 to the base of a transistor 254 which is thus turned on. The primary winding of a transformer 255 is connected in the collector-emitter circuit of the transistor 254 and a surge of current passes through this primary winding. This sets up a surge of current in the secondary winding of the transformer which is connected across a resistor 256. A diode 257 is connected in series with the secondary winding and the resistor 256 to permit current to flow through the resistor in one direction only. One end of the resistor is grounded and a point 258 which develops a negative potential when the current surge takes place is connected to a lead 259 which thus delivers a negative pulse to one input 260 of the "OR" gate 34, whose other input is indicated at 261.

The pulse on the lead 259 is fed back over a lead 262 to the base of the transistor 243 to restore the flip-flop 242-243 to normal.

The flip-flop 246-247 of the inhibitor circuit 33 is also restored to normal by means of a choke 263 which is charged when the transistor 247 comes on and thereafter delivers a negative pulse over a suitable coupling circuit 264 to the base of the transistor 246 to turn that transistor on again.

Visual indication of the operation of the circuit 33 is provided by means of the transistor 265 whose base is coupled to the collector of transistor 243 and thus comes on when that transistor shuts off. A neon lamp 266 in the emitter-collector circuit lights when the transistor 265 comes on.

The output 267 of the "OR" gate 34 delivers the negative pulse to the circuit 35 which comprises a pair of P-N-P transistors 268 and 269 which are connected in a flip-flop circuit. The lead 267 is coupled to the base of the transistor 268 and turns that transistor on and the other off. A negative level thus appears on a lead 270 connected to the collector of the transistor 269.

A restoring circuit comprising tandem connected transistors 271 and 272 and a transformer 273 having a primary winding connected in the collector circuit of transistor 272 and a secondary winding coupled back to the base of transistor 269 causes this transistor to come on again and the circuit to restore.

The negative pulse on the lead 270 from the circuit 35 is ampified by the two stage amplifier 36 which is identical with the amplifier 26 of FIGURE 6 and therefore need not be described in detail.

The output of this amplifier appears on a lead 274 which is labelled "transfer #2" and which effects the transfer of the information units which are in the buffer register 29 of the first subchannel. The pulse on this lead 274 enables the five stages of the first section of the block register.

In a similar manner the transfer lead 275 delivers the enabling transfer pulse to the stages of the second section of the register from an amplifier in the second subchannel circuit which is identical with the amplifier 36. Similarly the lead 276 delivers the transfer pulse from the third subchannel circuit to the stages of the third section and the lead 277 delivers the transfer pulse to the stage of the fourth section.

The function of the block shift register is to transmit the block of signals and this function proceeds under control of the pulse from the pulse generator 32 regardless of whether or not information has been transferred to a particular section from the associated subchannel equipment. If there has been no information transferred, or if the transfer pulse does not arrive before the pulse from the pulse generator 32, arrangement is made for making sure that that particular section of the block shift register contains a blank. This is accomplished by means of the following circuits:

The inhibitor gate 44 comprises a pair of P-N-P transistors 278 and 279 which are connected in a flip-flop circuit. An input lead 280 is coupled to the base of the transistor 279. The circuit is normally in the condition in which the transistor 278 is on and the transistor 279 is off. Another P-N-P transistor 281 has its emitter grounded and its collector connected to the lead 280 so that when it is on, the lead 280 is shorted to ground and no signal can affect the flip-flop 278–279. However, when the transistor 281 is off, the short is removed and the flip-flop 278–279 can be shifted to its other condition.

A lead 282 connected to the base of the transistor 281, is connected to the collector of the transistor 243 in the inhibitor circuit 33 of FIGURE 7. If the transfer pulse has been received by the transfer amplifier 28 of FIGURE 7 and the output on the lead 206 enables the buffer register 29 over the lead 203, the flip-flop 242–243 in the inhibitor circuit 33 is also shifted by the same pulse over the lead 241. This turns off the transistor 243 and its collector sends a negative level over the lead 282 to turn on the transistor 281 of the inhibitor gate 44 of FIGURE 8. The inhibitor gate is therefore disabled.

The next pulse from the pulse generator 32, passing over leads 266 and 248 is differentiated by the capacitor 283 and the grounded resistor 284 and is then distributed to the four subchannel circuits, the lead to subchannel 1 being indicated at 285. This lead is coupled to the lead 280 of the inhibitor gate 44 of FIGURE 8, but this circuit cannot respond.

If, however, previously to the arrival of the pulse from the pulse generator 32, no transfer pulse has been received, the transistor 243 in the inhibitor circuit 33 will be on and a positive level will turn the transistor 281 off in the circuit 44. When the pulse from the generator 32 arrives, it can then reach the flip-flop 278–279 and will shift the flip-flop with transistor 279 on and transistor 278 off. A negative pulse from the collector of the transistor 278 is delivered through a suitable coupling circuit to the base of a P-N-P transistor 286 which turns this transistor on. The primary winding of a transformer 287 is connected in the emitter-collector circuit and the resulting surge of current through this winding produces a surge of current through the secondary winding of the transformer which flows through a resistor 288 connected across the secondary in series with a capacitor 289 to limit the current to one direction. A point 290 which receives a negative pulse as a result of the current in the secondary winding is connected to an output lead 291 which delivers the pulse to the input 261 of the "OR" gate 34 of FIGURE 7. As has already been explained, the output of the "OR" gate 34 delivers the transfer pulse through circuits 35 and 36 and over lead 274 to enable the associated section of the block register 10.

At the same time the pulse on lead 291 is delivered to a lead 292 which is connected over coupling diodes to the bases of all the left transistors of the flip-flop pairs in the associated section, so that all these stages will indicate "space" and the character will be a "blank." The connections for the first section in the block shift register have been indicated but have not been shown for the other sections.

When the information as a block has been inserted into the block shift register 10, it is necessary to cause the information therein to shift step-by-step to drive the signals in sequence from the output stage 209. In order to do this, a cycling circuit is provided which will produce repetitive pulses at a higher rate than the rate at which the signals come in from the subchannels. This is accomplished by the following circuits:

The pulse from the pulse generator 32 is differentiated by means of the capacitor 293 and the grounded resistor 294 and is applied over a diode 295 to a lead 296 which is connected to one input 297 of an "OR" gate 40, shown in FIGURE 10. The "OR" gate has another input 298. The output of the "OR" gate is delivered over a lead 299 to the first 8.5 millisecond delay circuit 39 of FIGURE 10. This circuit is the same as that of the delay circuit 18 except for different parameters to give less time delay. Therefore it is necessary to describe it in detail. The incoming negative pulse triggers the flip-flop 300–301, and, after a delay of 8.5 milliseconds, a negative pulse is produced on the output lead 320 which is delivered over the advance lead 303 to the block shift register 10 to cause the information therein to shift one step. A lead 304 connected to the output 302 also delivers the pulse to the inhibitor circuit 41.

The inhibitor circuit 41 comprises a pair of P-N-P transistors 305 and 306 connected in a flip-flop circuit, the transistor 305 normally being off and the transistor 306 normally being on. Another P-N-P transistor 307 has its base coupled to the collector of the transistor 305 and is normally on when the transistor 305 is off. The transistor 307 has its emitter grounded and its collector is connected to a lead 308 which acts as the input lead for the remainder of the circuit and to which the lead 304 from the delay circuit 39 is connected. With the transistor 307 on, this input lead 308 is shorted to ground and the pulse from the delay circuit 39 cannot affect the remainder of the circuit.

The pulse from the pulse generator 32 that triggered the delay circuit 39 has also turned on the transistor 305 and thus shut off the transistor 307. The short to ground on the lead 308 has thus been removed and the pulse from the delay circuit 39 is free to act on the remainder of the circuit which comprises a pair of P-N-P transistors 309 and 310. The pulse from the delay circuit turns on the transistor 310 which is normally off, and the transistor 309, shutting off, drives its collector in the positive direction, thus turning on a transistor 311 whose base is coupled to it over a coupling capacitor 312.

The primary winding of a transformer 313 is connected in the emitter-collector circuit of the transistor 311 and receives a surge of current when the transistor comes on which produces a surge of current in the secondary winding which is connected across a resistor 314 in series with a diode 315 to limit the flow of current to one direction. A point 316 which receives a negative potential when the transistor 311 comes on is connected over a lead 317 to the input of a second 8.5 millisecond delay circuit 42 which is identical to the delay circuit 39.

The pulse on the lead 317 triggers the delay circuit 42, and 5.8 milliseconds later a negative pulse appears on the output lead 318 and is delivered to the inhibitor gate 43 which is identical with the inhibitor gate 44 and need not be described in detail. The transistor 319 in this circuit has been turned off by the positive potential on its base over the lead 320 from the collector of the transistor 305 in the inhibitor circuit 41, and this removes the short from the input 321 so that pulse on the lead 318 from the delay circuit 42 can trigger this flip-flop circuit (not shown) which forms the remainder of the circuit 43. A negative pulse then appears on the lead 322 which is delivered to the input 298 of the "OR" gate 40.

The output of the "OR" gate 40 will again trigger the first 8.5 millisecond delay circuit 39, and from then on the cycle is repeated to cause the delay circuit 39 to produce a succession of pulses as long as the inhibitor circuit 41 remains in the operated condition.

Each time the first delay circuit 39 produces a pulse, it will appear on the "advance" lead 303 of the block shift register 10, so that the information therein advances step-by-step out of the output lead 46 connected to the collector of the right flip-flop transistor in the output stage 209.

The lead 46 from the output stage of the block shift register is connected to the base of a P-N-P transistor 323 in a driver circuit 324, shown in FIGURE 11. This transistor is connected in a circuit which normally maintains it off and the pulse over the lead 46 turns it on. The emitter of the transistor is connected to ground and the collector is connected to an inverter amplifier 325 over a lead 326. The inverter amplifier is used or not depending on the desired polarity of the output signal. Accordingly the lead 326 is connected to one terminal of a set of three jumper terminals 327 and also to the base of a transistor 328 whose emitter is grounded and whose collector is connected to another terminal of the jumper set. A lead 329 connects the third terminal of the jumper set to the output circuit 47.

The transistor 323 is arranged to be normally off and the negative pulse over the lead 46 turns it on, thus producing a positive potential on its collector. The transistor 328 is arranged to be normally on. With the jumper connection as shown, the positive pulse from lead 326 is delivered directly to the output circuit. With the jumper connected between the central and lowermost terminals the positive pulse on lead 326 is delivered to the base of the transistor 328 which turns it off, and a negative pulse then is fed to the output circuit over lead 329.

The output circuit 47 is a multi-purpose solid-state relay having an N-P-N transistor 330 and a P-N-P transistor 331 arranged in a circuit so that when the incoming pulse is positive, transistor 330 comes on and transistor 331 goes off, and when the pulse is negative, the opposite result is obtained. Two other P-N-P transistors 332 and 333 are also provided and sets of jumper terminals 334, 335 and 336 are used to connect the transistors in different circuits for producing a neutral or polar output with either polarity. The transistor 332 controls the polar output, while the transistor 333 controls the neutral output.

As shown, the circuit is connected for negative neutral output. The jumper of set 327 is connected so that positive pulses coinciding with "space" signals are delivered directly from the driver 324 over the leads 326 and 329 to the bases of transistors 330 and 331 in the relay circuit 47. This positive pulse turns the transistor 330 on, since it is an N-P-N transistor, and this swings the base of the transistor 333 in the negative direction because ground is connected over the emitter-collector circuit of transistor 330 and the jumpers at the terminal sets 334 and 335 to the base. This turns on transistor 333 and a negative 60 volt potential is delivered over the jumper of terminals 336, the emitter-collector circuit of transistor 333 to the negative neutral output terminal 337.

When a "mark" signal arrives, the bases of transistors 330 and 331 are driven in the negative direction and the transistor 330 shuts off followed by the transistor 333 to cut off the potential from the output lead.

By changing the jumpering at the terminals and using other terminals for the outputs, any type of signal may be produced with the same signal delivered by the driver circuit 324.

The signal from the output relay 47 is delivered directly to the line 48 which leads to the receiving station.

When the entire block of signals has been fed out of the block shift register 10 over the output lead 46, it is necessary to stop the cycling operation of the delay circuits 39 and 42 so as to stop the advance of the register. This is accomplished by means of the "AND" gate 49 shown in FIGURE 9.

The circuit 49 comprises a plurality of diades 49a, one for each stage of the register. Each diode has its positive terminal connected to the collector of the left transistor of one of the stages of the register. For example, the diode 49b is connected to the collector of the transistor 238 of the "start" stage over a lead 49c. The other terminals of all the diodes are connected together and to a point in a voltage divider circuit 49d. Another point in this circuit is connected over a lead 49e to the amplifier 50 of FIGURE 10. The output of this amplifier is connected over the lead 50a to the base of the transistor 306 of the inhibitor circuit 41. As long as any one stage of the register is in the "space" condition, the lead 49e will have near ground potential on it. But when all the stages of the register are in "mark" condition, as they will be when the block of signals has been completely discharged, the potential of the lead 49e will swing in the negative direction and apply a negative potential to the base of the transistor 306 to turn it on and thus shut off the inhibitor circuit to prevent the passage of pulses between the delay circuits 39 and 42. This, of course, stops the cycling circuit, and the register will be in its normal condition for receiving the next block of signals.

*The receiving station*

Many of the circuits of the receiving station are identical or very similar to those of the transmitting station, and where this is the case, just enough of the circuits have been shown for a clear understanding of the operation.

For example, the transmission line 48 is connected to a solid-state relay 57 which may be identical with the solid-state relay 12 of FIGURE 4, used with each subchannel equipment for receiving the signal units representing the characters from the subchannel tapes. Regardless of the type of signal which is used for transmission, this circuit will produce a negative level on the lead 58 for a "space" signal and a positive level on the lead 66. For a "mark" signal, the potentials will be reversed.

It will be noted that the block of signals sent out by the transmitting station comprises a "start" or "space" signal, followed by a sequence of intelligence signals, representing one character from each channel. This block of signals is fed into a block shift register 52 of FIGURE 14 which is similar to the block shift register 10 of FIGURE 9, used at the transmitting station, having a stage for each of the signals. The manner of feeding the incoming signals into the block shift register will now be described.

The "space" signal, which is the first to arrive, appears as a negative level on the lead 58 which is integrated in the circuit 59 comprising a resistor 350 and a capacitor 351. This is connected to a differentiator comprising a capacitor 352 and a resistor 353. The output of this circuit is fed over a suitable diode 354 to an inhibitor circuit 61 shown in FIGURE 13, over a lead 355 and to an inhibitor gate 60 over a lead 356.

The inhibitor circuit 61 is shown in FIGURE 13. It is identical with the inhibitor circuit 41 shown in FIGURE 10. It comprises a pair of P-N-P transistors 357 and 358 arranged in a flip-flop circuit and the lead 355 is coupled to the base of the left transistor 357. The collector of this transistor 357 is connected to the base of a transistor 359 which controls the cycling circuit, as will be explained.

The lead 356 from the circuit 59 of FIGURE 12 carries the pulse which triggers the cycling circuit. It is connected to the collector of a P-N-P transistor 360 in the inhibitor gate 60, which transistor, when on, shorts the pulse to ground, but, when off, permits the pulse to continue over the lead 361 to trigger the delay circuit 64 of FIGURE 13.

The inhibitor gate 60 is opened to permit the passage of the pulse by a negative level which appears on the collector of the transistor 358 of the inhibitor circuit 61 and is delivered over the lead 362 to the base of the transistor 360.

The pulse on the lead 361 is delivered to one input 363 of the "OR" gate 63 of FIGURE 13, the other input being indicated at 364. The output 365 of the "OR" gate 63 applies the pulse to the base of the left transistor 366 of the flip-flop pair 366–367 of the delay circuit 64. This delay circuit is identical with the delay circuit 39 of FIGURE 10 and produces a delay of 8.5 milliseconds, so that a negative pulse passes out of it over the lead 368 at a time 8.5 milliseconds after it was triggered and is delivered to the input 369 of the inhibitor circuit 61 which is connected to the collector of the transistor 359. Since this transistor has been turned off, the pulse on the input lead 369 is free to affect the remainder of the circuit, and a negative pulse then appears on the output lead 370 which triggers the second 8.5 millisecond delay circuit 67. This circuit is also identical with that of the circuit 39 of FIGURE 10 and produces a pulse 8.5 milliseconds later which is delivered over the lead 371 to the inhibitor gate 69 which is identical with the circuit 44 of FIGURE 8. The controlling transistor 372 in this circuit has been shut off by the positive level from the collector of the transistor 357 of the inhibitor circuit 61 which is delivered to the base of the transistor 372 over the lead 373. Thus the pulse over lead 371 is free to affect the remainder of the circuit over the input lead 374 to which the lead 371 is connected and which is connected to the collector of the transistor 372. A negative pulse then appears on the output lead 375 which is delivered to the other input 364 of the "OR" gate 63 and appears on the output 365 to trigger the delay circuit 64 again.

The inhibitor circuit 61 will remain operated until it is shut off in a manner to be described, and as long as it is operated, the cycling of the two delay circuits 64 and 67 will continue.

At the same time that a negative level is produced on the lead 58 from the solid-state relay 57 by the "space" signal representing "start," a positive level appears on the lead 66 from the relay. This potential has the effect of opening the inhibitor gate 65 by virtue of the lead 66 being connected to the base of a transistor 376 in that circuit, the emitter of which is connected to ground. The transistor is shut off and this permits the negative pulse from the first delay circuit 64 which is delivered over lead 377, connected to the collector of the transistor 376, to pass out of the circuit 65 on the output lead 378 to the block shift register 52 of FIGURE 14 to set the input stage 379 in the "space" condition.

It is now necessary to advance the block shift register at the same rate as the signal units of the block of signals is being received. This is accomplished by an "advance" pulse over a lead 380 which is applied in common to the bases of the right flip-flop transistors of all the stages in the block shift register. This will cause the information to shift in the manner already explained in connection with the block shift register at the transmitting station.

Each time the second delay circuit 67 produces a pulse, the block shift register will be advanced, and after each advance, a pulse from the first delay circuit 64 over lead 377 and lead 378 will set the input stage 379. If the signal then being received is a "space," the inhibitor gate 65 will be open to permit the pulse from lead 377 to pass over lead 378 to the input stage 379 of the block shift register. If the signal is a "mark," the inhibitor gate 65 will be closed and the pulse on lead 377 is shorted to ground so that it cannot reach the block shift register.

In this manner the entire block of signals received over the solid-state relay 57 is entered into the block shift register and when it is filled, the "start" signal will be in the "start" stage 381 and the left transistor 382 will be on, while the right transistor 383 will be off. In this condition, the collector of the transistor 383 will deliver a negative potential level over the lead 70 which is connected to it. This is the "transfer" signal which initiates the transfer from each section of the register of the information for the associated subchannel.

The lead 70 delivers the signal to the input of a transfer amplifier 71, shown in FIGURE 12. The circuit of this amplifier is identical to that of the amplifier 26 shown in FIGURE 6 and the amplified output on the lead 384 performs several functions. It is applied to the lead 385 which is multipled to all of the subchannel equipments, as indicated, for effecting the transfer from each section of the block shift register to the associated subchannel parallel-to-series shift register 74.

An additional transfer amplifier 75 of FIGURE 12 is provided in each subchannel circuit. This amplifier is identical to the amplifier 26 of FIGURE 6 and produces an amplified transfer pulse on the lead 386 which is delivered to the parallel-to-series shift register 74 shown in FIGURE 16. It effects the transfer by enabling the input circuits for the left transistor in each stage except the output stage 387.

The bases of the left transistors of stages 1 to 5 are connected respectively to the collectors of the right transistors of the corresponding stages of the block shift register 52. These connections are indicated by the bracketed leads 388 and the single lead 389 which is connected to the bracketed leads 390 from the collectors of the right transistors of the register 52. If a stage of the block register, for example stage 1, is in the "space" condition, then the right transistor 391 is off and its collector produces a negative level which, at the instant of the transfer pulse, will appear on the input lead for the base of the left transistor in stage 1 of the register 74. If the stage registers a "mark," the right transistor will be on and a positive level will appear on the base of the transistor in the register 71 which will turn the left transistor off if it is not already off.

It will be understood that the transfer signal from the lead 385 from the transfer amplifier 71 will be sent to each of the subchannel parallel-to-series shift registers so that the information is transferred simultaneously from each section of the block shift register to its associated parallel-to-series shift register corresponding to the register 74. The leads 389a, 389b, and 389c lead respectively to the second, third, and fourth subchannel shift registers.

After the information has been transferred out of the block shift register, that register must be returned to its normal condition to be ready for the next block of signals that will be forthcoming over the transmission line. This is accomplished by means of a delay circuit 72 of FIGURE 12 which is identical to the delay circuit 37 of FIGURE 11. This circuit is triggered by the pulse from the transfer amplifier 71 over its output lead 384 and a lead 392 connected to the output lead. After a sufficient delay to ensure that the transference has taken place, a negative pulse is produced on the output lead 73 which is fed to the "advance" lead 380 for the block shift register 52. By this time the circuits in that register which cause the shifting have been discharged and all the right transistors are turned on which is the normal or "mark" condition of the register.

At the same time that the information is transferred from the block shift register to the parallel-to-series shift registers, a "start" signal is inserted in each of the latter registers. This is accomplished by means of a connection 393 between the base of the left transistor 394 of the "start" stage 395 and 12 volts negative through a resistor 396. The transfer pulse on the lead 386 effects this transfer in a similar manner as the transfer into the other stages.

Having transferred the information signals to the parallel-to-series shift registers and inserted the "start" signals therein, it is now necessary to cause these registers to advance the signals in the direction of the arrow through the registers and to feed them out of the output stage 387 so that they might be fed into the associated subchannel. In order to do this the cycling circuit for each subchannel comprising the two delay circuits 83 and 85 produces an "advance" pulse at a slower rate than that at which the block of signals was fed into the block shift register 52. These circuits are operated as follows:

The pulse from the transfer amplifier 71 is fed over a lead 397 to the amplifier 71a which is also identical to the amplifier 26 of FIGURE 6. The amplified pulse is fed over lead 398 to the differentiator 80 of FIGURE 15 from which a pulse is fed to one input 399 of the "OR" gate 82, the other input of which is indicated at 400. The output of the "OR" gate 82 is fed over a lead 401 to trigger the first 10 millisecond delay circuit 83 which is identical with the delay circuit 18 of FIGURE 5. After 10 milliseconds, a negative pulse appears on the output lead 84, and this pulse is delivered over a lead 402 connected to lead 84 so as to trigger the second 10 millisecond delay circuit 85 which is identical to the circuit 83. The output of the delay circuit 85 delivers a negative pulse 10 milliseconds later over a lead 403 to the inhibitor circuit 86. This inhibitor circuit is the same as the circuit 41 of FIGURE 10 and permits the pulse to pass through it to its output lead 404 because it has been operated by a pulse from the amplifier 71a over the lead 398 and a lead 405 which sends the pulse through the differentiator 87 to shift the first flip-flop of the circuit 86.

The pulse from the output of the inhibitor circuit 86 is delivered over the lead 404 to the input 400 of the "OR" gate 82 and hence triggers the first delay circuit 83 again. The inhibitor circuit 86, once operated by the pulse from the amplifier 71a, will remain operated until shut off in a manner to be described.

Thus the two delay circuits 83 and 85 will continue to operate successively as long as the inhibitor circuit 86 is operated.

Each time the first 10 millisecond delay circuit 83 operates, a pulse from its output is delivered over the "advance" lead 84 to the parallel-to-series register 74 to advance the information therein one stage towards the right. And each time the information advances, the signal then in the output stage 387 is driven out over the lead 88 to the driver circuit 406 which is identical to the driver circuit 324 of FIGURE 11. The output lead 407 is connected to the inverter amplifier 408 which is identical to the inverter amplifier 325 of FIGURE 11. The output of the inverter amplifier is delivered over a lead 409 to the multi-purpose solid-state relay 89 which is identical to the relay 47 of FIGURE 11. By means of this relay, the signal sequence representing a character is sent into the subchannel over the leads 410.

The circuit 91 of FIGURE 16 is provided to stop the cycling of the delay circuits 83 and 85 after the signals representing the character have been driven out of the parallel-to-series shift register 74. This circuit, called the "zero detect" circuit is an "AND" gate having an input for each of the stages of the register, including the "start" stage and the "output" stage. Each input is provided with a diode, the diode for the "start" stage, for example, being indicated at 411. All the diodes are poled for current flow away from the register. The diode 411 is connected to the collector of the left transistor 394 of the transistor pair in the "start" stage, and the other diodes are similarly connected to the transistors of the associated stages. All of the diodes have their other terminals connected to a point on a voltage divider circuit between a resistor 412 whose other end is connected to a potential of 12 volts negative and a pair of series connected resistors 413 and 414, the other end of the resistor 414 being connected to a positive potential of 12 volts. A capacitor 415 is connected between the junction of the resistors 413 and 414 and ground. The output lead 416 is also connected at the junction of these two resistors.

The circuit 91 is adjusted so that as long as any one of the stages is registering a "space" so that its left transistor is on and the collector thereof has a ground potential, the potential on the output lead 416 is at its positive limit, but when all of the stages are in the "mark" condition with the left transistors off and the collectors thereof negative, the output lead becomes more negative. This output lead is connected to the inhibitor circuit 86 of FIGURE 15 and a negative potential on the lead is delivered to the base of the right transistor 417 of the first flip-flop pair and has the effect of shuting off the circuit to prevent the passage of the pulse between the two delay circuits 83 and 85. This stops the cycling and therefore stops the advance pulse which stops the advance of the register. At this time the register is ready to receive the next character from the block register.

In case the character transferred to the parallel-to-series register is a "blank" (i.e. all "space" signals), which would be the case if the block of signals was transmitted by the transmitting station before a character had been transferred from the corresponding one of the series-to-parallel registers to the block shift register, there would be no use in sending the signals to that particular subchannel. The circuit 92 of FIGURE 16 operates in this event to prevent the sending of these signals.

A plurality of diodes 418 are connected respectively to the collectors of the left transistors of the information stages 1 to 5 of the parallel-to-series register 74. The diodes are poled for current flow towards the register. The other terminals of the diodes are connected to the base of a P-N-P transistor 419 connected in a suitable circuit normally to maintain it on when any one of the stages is in the "mark" condition. When all the five information stages are registering "space," the diodes 418 are blocked and the transistor 419 shuts off. The collector of the transistor 419 is connected to negative 12 volts over a resistor 420, while the emitter is connected to the junction of a diode 421 and a resistor 422 which are connected in series between 12 volts positive and ground. The diode is poled for current flow in the direction of ground.

The emitter of the transistor 419 is connected to the base of a transistor 423 which is on when the transistor 419 is on. When the transistor 419 is shut off, the base of the transistor 423 swings in the positive direction and is also shut off. This causes the potential of the collector and of the output lead 424 connected to it to swing in the negative direction. The lead 424 is connected over a lead 425 to the "advance" lead 84 of the register 74 and acts to restore all the stages to the "mark" condition, so that they will be ready for the receipt of the next character. The lead 424 also is connected to the base of the transistor 417 of the inhibitor circuit 86 of FIGURE 15 to shut it off and thus stop the cycling.

In operation the character sequences are fed intermittently to the individual series-to-parallel shift registers at the transmitting station and when any one of these registers has transferred its character to the block shift register, the block shift register will transmit its block of signals at a higher speed than the signals were received from the subchannels, this transmission being entirely independent of the feeding of the signals into the subchannel registers. The block shift register at the receiving station receives the block of signals from the transmission line. Its stepping is initiated by the receipt of the "start" signal but otherwise is independent of the incoming signals, operating from its own timing circuit. And signals are sent sequentially to the subchannels at the receiving station only when they have been transferred to the particular parallel-to-series shift register.

The circuits have been shown and described for use with four subchannels and with a seven unit code. It will be evident, however, that it may easily be designed for other codes and for different numbers of subchannels.

Also the circuits of the transmitting station and the receiving station are much the same with the exception of the buffer register at the transmitting station which is not used at the receiving station. For this reason it is possible to have identical sets of circuits for both the transmitting station and receiving station with suitable jumper terminals for making the necessary connections for the particular use.

All the circuits are transistorized and may be printed on cards with the transistors and other components of the circuits mounted on the cards in their proper places.

Many other modifications may be made in the circuits as shown and described without departing from the spirit of the invention, and I do not therefore desire to limit myself to what has been shown and described except as such limitations occur in the appended claims.

What I desire to claim and secure by Letters Patent is:

1. A telegraph channel divider system comprising:
(A) a transmitting station,
(B) a receiving station, and
(C) a transmission line between said transmitting and receiving stations, said transmitting station comprising:
  (a) separate means for receiving telegraph signals from a plurality of subchannels, said signals being of the type in which each character comprises a "start" unit, a plurality of intelligence units, and a "stop" unit,
  (b) storage means including a shift register, and means for simultaneously transferring information from all input channels to the shift register in parallel for arranging the intelligence units in a sequence of characters with one character received from each subchannel,
  (c) means for inserting a "start" signal at the beginning of said sequence, and
  (d) means for transmitting said sequence of signals preceded by said inserted "start" signal from said storage means over said transmission line; said receiving station comprising:
    (a) storage means for storing the sequence of signals received from said transmission line,
    (b) means responsive to the receipt of the complete sequence of signals for producing a transfer signal,
    (c) a plurality of output means, there being one for each subchannel, and
    (d) means responsive to said transfer signal for delivering each group of intelligence signals representing a character sequentially to the respective output means preceded by a "start" signal.

2. A telegraph channel divider system comprising:
(A) a transmitting station,
(B) a receiving station, and
(C) a transmission channel connected therebetween; said transmitting station (A) comprising:
  (a) a plurality of subchannel input means adapted to receive telegraph signals of the type in which each character comprises a "start" unit, a plurality of intelligence units, and a "stop" unit,
  (b) separate means connected to each input means for producing a transfer signal when all the signals representing a complete character have been received,
  (c) a first block storage means having sections, one for each of said input means, the sections being arranged in series,
  (d) separate means connected between each of said input means and respective sections of said first block storage means and responsive to said transfer signal for transferring the signals from said input means to said first block storage means without transferring the "start" and "stop" signals, and
  (e) means connected to said first block storage means and responsive to signals being received from at least one of said input means for causing said first block storage means to deliver signals stored therein seriatim to said transmission channel; said receiving station (B) comprising:
    (a) a second block storage means having the same number of sections as said first block storage means,
    (b) means connected between said second block storage means and said transmission channel for entering a succession of signals received over said transmission channel into said second block storage means,
    (c) means in said second block storage means for producing a transfer signal when a complete block of signals has been received thereby,
    (d) a plurality of subchannel output means, there being one for each subchannel,
    (e) means connected between the individual subchannel output means and the respective sections of said second block storage means and responsive to said last-mentioned transfer signal for transferring the signals in each section of said block storage means into the corresponding subchannel output means and for inserting a "start" signal into each of said subchannel output means, and
    (f) separate means connected to each of said subchannel output means and responsive to the receipt of said signals from said second block storage means for causing said subchannel output means to transmit said signals seriatim.

3. A telegraph channel divider system, as defined in claim 2, in which the means for causing the first block storage means to deliver signals stored therein seriatim comprises:
  (a) means for producing a series of electrical pulses at a predetermined rate, and
  (b) means responsive to signals being received by said first block storage means from at least one of said input means for causing the pulses from said pulse producing means to operate said first block storage means to deliver the signals stored therein at the rate of said pulses.

4. A telegraph channel divider system, as defined in claim 2, in which each subchannel input means comprises a series-to-parallel shift register and each subchannel output means comprises a parallel-to-series shift register.

5. A telegraph channel divider system, as defined in claim 4, further comprising:
  (a) separate means connected to each parallel-to-series shift register at the receiving station and operative only if the signals representing the intelligence portion of the character contained in the associated parallel-to-series shift register are all of the same predetermined value for resetting said shift register to its normal condition, and
  (b) separate means connected to each parallel-to-series shift register at the receiving station and responsive to all the signals stored in the associated parallel-to-series shift register being of the same predetermined value for preventing the operation of the means for causing the parallel-to-series shift register to transmit signals seriatim.

6. A telegraph channel divider system, as defined in claim 2, further comprising:
  (a) separate means connected to each subchannel output means at the receiving station and operative only if the signals representing the intelligence portion of the character contained therein are all of the same predetermined value for resetting said subchannel output means to its normal condition, whereby the associated subchannel will be kept in a predetermined condition, and
  (b) separate means connected to each subchannel output means at the receiving station and responsive to all the signals stored therein being the same predetermined value for preventing the operation of the means for causing the output subchannel means to transmit signals.

7. A telegraph channel divider system comprising:
(A) a transmitting station,
(B) a receiving station, and
(C) a transmission channel connected therebetween; said transmitting station comprising:
  (a) a plurality of subchannel input means adapted to receive telegraph signals of the type in which each character comprises a "start" unit, a plurality of intelligence units, and a "stop" unit,
  (b) a series-to-parallel shift register in each input means and means for feeding the received signals of its associated subchannel seriatim into it, said register having a stage for each unit of the character signal,
  (c) a first block shift register having a plurality of sections, one for each series-to-parallel shift register, each section having a number of stages corresponding to the number of intelligence units in a character and in addition having an output stage and a "start" stage, said "start" stage being between said output stage and the next adjacent intelligence stage,
  (d) connecting means connecting intelligence stages of each said series-to-parallel shift register with corresponding stages of the corresponding section of said first block shift register,
  (e) means in each series-to-parallel shift register for producing a transfer signal when a complete character has been received thereby,
  (f) means connected to each of said series-to-parallel shift registers and to said first block shift register and responsive to said transfer signal for transferring the signals representing intelligence in said intelligence stages of said associated series-to-parallel shift register to the corresponding stages of the section of said first block shift register allotted to it without transferring signals representing "start" and "stop,"
  (g) means also responsive to said transfer signal for inserting a "start" signal into the "start" stage of said first block shift register,
  (h) means connected between said first block shift register and said transmission channel for delivering signals produced by the output stage of said first block shift register to said transmission channel, and
  (i) means connected to said first block shift register and responsive to the signals from at least one of said transferring means for causing said first block shift register to shift successively and thereby produce a series of output signals which are transmitted by said transmission channel to said receiving station, which signals comprise a "start" unit and a block of the intelligence units of one character from each of the subchannels; said receiving station (B) comprising:
  (a) a second block shift register having a number of sections corresponding to the number of subchannels and each section having a number of stages equal to the number of units in a character, said register also having a "start" stage,
  (b) means connected between said second block shift register and said transmission channel for entering a succession of signals from said transmission channel into said second block shift register,
  (c) means in said second block shift register for producing a transfer signal when the complete block of signals has been entered thereinto and the signal representing the "start" unit is in the "start" stage,
  (d) a plurality of parallel-to-series shift registers, there being one for each subchannel and each having a number of stages equal to the number of intelligence signal units in a character and in addition a "start" stage and an output stage,
  (e) means connected between the individual stages of said second block shift register and corresponding stages of corresponding parallel-to-series shift registers and responsive to said last-mentioned transfer signal for transferring signals simultaneously from the sections of said second block shift register to said respective parallel-to-series shift registers and for inserting a "start" signal into the "start" stage of each of them,
  (f) a subchannel output means for each of said parallel-to-series shift registers,
  (g) means connected between each parallel-to-series shift register and the corresponding subchannel output means for receiving signals from the output stage of each parallel-to-series shift register and delivering them to the respective subchannel output means, and
  (h) means responsive to the receipt of signals by a parallel-to-series shift register for causing said register to shift signals representing the intelligence in the stages thereof seriatim out of the output stage thereof.

8. A telegraph channel divider system comprising:
(A) a transmitting station,
(B) a receiving station, and
(C) a transmission line between said transmitting and receiving stations; said transmitting station comprising:
  (a) a plurality of subchannel input means adapted to receive telegraph signals of the type in which each character comprises a "start" unit, a predetermined plurality of intelligence units, and a "stop" unit, each of said input means including a series-to-parallel shift register and means for feeding the received signals into the input end thereof,
  (b) a first intermediate-speed pulse-producing means adapted to produce a sequence of pulses at a predetermined time after the initiation of the operation thereof and at the rate of the incoming character units,
  (c) separate means connected respectively to the input means and responsive to a signal representing a "start" unit received by its associated input means for initiating the operation of said first intermediate-speed pulse-producing means,
  (d) means at each input means connected to the series-to-parallel shift register thereof and to the associated first intermediate-speed pulse-producing means for causing each pulse thereof to shift the contents of said shift register by one stage in a direction away from said input end,
  (e) a first block shift register having a number of sections equal to the number of said input means and each section having a number of stages equal to the number of intelligence units in a signal character and having an additional output stage and an additional "start" 'stage between said output stage and the next adjacent intelligence stage,
  (f) means in each series-to-parallel shift register for producing a transfer signal when a complete character has been entered therein,
  (g) a low-speed pulse producing means adapted to produce a sequence of pulses at a rate such that the time between adjacent pulses is equal to or slightly less than the time during which an entire group of signals representing a character is received by said input means, (h) means connected between each section of said first block shift register and a respective series-to-parallel shift register and to said low-speed pulse producing means and operative only if a transfer pulse has been received from said transfer pulse-producing means for transferring the signals representing the intelligence units stored in the intelligence stages therein to the corresponding stages of said first block shift register at the time of the low-speed pulse, (i) a first high-speed pulse-producing means adapted to produce a sequence of pulses at a faster rate than the pulse-producing rate of said first medium-speed pulse-producing means, (j) means connected between said low-speed pulse-producing means and said first block shift register for causing said register to shift one step in response to the production of a pulse, (k) means connected between said low-speed pulse-producing means and said first high-speed pulse-producing means for initiating the operation of said first high-speed pulse-producing means in repsonse to a pulse from said low-speed pulse-producing means, (l) means connected between said first high-speed pulse-producing means and said first block shift register for causing said register to shift one step in response to each pulse from said first high-speed pulse-producing means, whereby a series of signals appears at the output stage of said first block shift register, and (m) means connected between said output stage of said first block shift register and said transmission line for feeding signals from said output stage to said transmission line, whereby a block of signals representing the intelligence units of one character from each subchannel is transmitted over said line; said receiving station comprising:

(a) a second block shift register having the same number of sections as said first block shift register, (b) a second high-speed pulse-producing means adapted to produce pulses at the same rate as said first high-speed pulse-producing means, (c) means connected between said transmission line and said second block shift register and controlled by said second high-speed pulse-producing means for feeding signals received over said transmission line to said second block shift register, (d) a plurality of subchannel output means each including a parallel-to-series shift register having the same number of stages as there are signal units in a character, (e) means in said second block shift register for producing a transfer signal when a complete block of signals has been entered therein, (f) connecting means between each section of said second block shift register and a respective one of said parallel-to-series shift registers and responsive to said transfer signal for simultaneously transferring the signals representing the intelligence units in that section to said associated parallel-to-series shift register and for inserting a signal representing a "start" unit into the "start" stage thereof, (g) a second intermediate-speed pulse-producing means for each parallel-to-series shift register, and (h) separate means connected respectively between said second intermediate-speed pulse-producing means and said parallel-to-series shift registers and responsive to said transfer signal for causing the pulses produced by each said intermediate-speed pulse-producing means to step the respective parallel-to-series shift registers and thus send a sequence of signals representing a character from the output stages thereof.

9. A telegraph channel divider system for use with telegraph signals of the type in which each character comprises a "start" unit, a plurality of intelligence units, and a "stop" unit transmitted in a sequence at a predetermined rate, said system comprising:

(A) a transmitting station,
(B) a receiving station, and
(C) a transmission line between said transmitting and receiving stations; said transmitting station comprising:

(a) a plurality of subchannel input circuits each adapted to receive intermittently transmitted signal sequences representing characters, (b) a first low-speed pulse generating means for producing a sequence of pulses at a rate such that the time between pulses is equal to or slightly less than the transmission time of one character, (c) a first plurality of intermediate-speed pulse generating means, one for each input circuit, for producing a sequence of pulses at said predetermined transmission rate, (d) a first high-speed pulse generating means for producing a sequence of pulses at a rate greater than that of said intermediate-speed pulse-generating means, (e) means connected to each subchannel input circuit for initiating the operation of the associated intermediate-speed pulse generating means, (f) means thereafter controlled by the pulses from an operated intermediate-speed pulse generating means for feeding received signals step-by-step into the associated input circuit, (g) a first storage means having sections, one for each subchannel input circuit, (h) means responsive to the receipt of the signals representing a complete character by an input circuit and operated by a pulse from said low-speed pulse generating means for transferring said signals into the associated section of said storage means, and (i) means responsive to the transference of signals into a section of said storage means and initiated by a pulse from said low-speed pulse generating means and controlled by pulses from said high-speed pulse generating means for feeding the signals from said storage means seriatim over said transmission line in a block; said receiving station comprising:

(a) a second storage means having the same number of sections as said first storage means, (b) a second high-speed pulse producing means for producing pulses at the same rate as said first high-speed pulse producing means.

(c) means for receiving signals from said transmission line, (d) means responsive to a "start" signal received by said receiving means for initiating the operation of said second high-speed pulse producing means, (e) means under control of the pulses from said high-speed pulse-producing means for feeding signals received by said receiving means into said second storage means,

33

(f) a plurality of subchannel output circuits, one for each section of said second storage means, (g) means responsive to the receipt by said second storage means of a complete block of signals for transferring the signals in each section to the associated output circuit, (h) a second intermediate-speed pulse-producing means for each output circuit for producing pulses at the same rate as said first intermediate speed pulse-producing means, (i) means responsive to the transference of signals from said second storage means to said output circuits for initiating the operation of said second intermediate-speed pulse-producing means, (j) means responsive to the transference of the signals into said output circuits and controlled by the pulses from said second intermediate-speed pulse-producing means for feeding said signals seriatim from each output circuit.

10. A telegraph channel divider system, as defined in claim 9, further comprising:

(a) means connected to each input circuit at the transmitting station and responsive to a complete character being received thereby for stopping the operation of the first intermediate-speed pulse-producing means associated therewith, (b) means connected to the first storage means and responsive to a complete block of signals being fed therefrom for stopping the operation of the first high-speed pulse-producing means, and (c) means responsive to the signals representing a complete character being fed out of an output circuit for stopping the operation of the associated intermediate-speed pulse-producing means.

11. A telegraph channel divider system, as defined in claim 10, in which the low-speed pulse-producing means is entirely independent of the pulses from the intermediate-speed pulse-producing means.

12. A telegraph channel divider system, as defined in claim 11, in which the individual intermediate-speed pulse-producing means at the transmitting station are entirely independent of each other, so that signals can be received from the subchannels at random times.

13. A telegraph channel divider system, as defined in claim 1, in which the separate means for receiving signals from the subchannels are entirely independent of each other and are independent of the means for transmitting the sequence of signals over the transmission line.

14. A telegraph channel divider system comprising:
(A) a transmitting station,
(B) a receiving station, and
(C) a transmission line between said transmitting and receiving stations, said transmitting station comprising:

(a) a separate means for receiving telegraph signals from a plurality of subchannels, said signals being of the type in which each character comprises a "start" unit, a plurality of intelligence units, and a "stop" unit, and including a shift register for each subchannel, means connected to each shift register for advancing said register step-by-step, and means responsive to the receipt of a "start" signal for initiating the operation of said advancing means.

(b) storage means for arranging the intelligence unit in a sequence of characters with one character received from each subchannel,

34

(c) means for inserting a "start" signal at the beginning of said sequence, and (d) means for transmitting said sequence of signals preceded by said inserted "start" signal from said storage means over said transmission line; said receiving station comprising:

(a) storage means for storing the sequence of signals received from said transmission line, (b) means responsive to the receipt of the complete sequence of signals for producing a transfer signal, (c) a plurality of output means, there being one for each subchannel, and (d) means responsive to said transfer signal for delivering each group of intelligence signals representing a character sequentially to the respective output means preceded by a "start" signal.

15. A telegraph channel divider system comprising:
(A) a transmitting station,
(B) a receiving station, and
(C) a transmission line between said transmitting and receiving stations, said transmitting station comprising:

(a) separate means for receiving telegraph signals from a plurality of subchannels, said signals being of the type in which each character comprises a "start" unit, a plurality of intelligence units, and a "stop" unit, (b) storage means for arranging the intelligence unit in a sequence of characters with one character received from each subchannel, (c) means for inserting a "start" signal at the beginning of said sequence, and (d) means for transmitting said sequence of signals preceded by said inserted "start" signal from said storage means over said transmission line; including means for producing a succession of pulses at a rate which is greater than the rate at which signals are received from the subchannels, means responsive to each of said pulses for transmitting one signal from said storage means, and means responsive to the number of signals in said storage means for initiating the operation of said pulse producing means; said receiving station comprising:

(a) storage means for storing the sequence of signals received from said transmission line, (b) means responsive to the receipt of the complete sequence of signals for producing a transfer signal, (c) a plurality of output means, there being one for each subchannel, (d) means responsive to said transfer signal for delivering each group of intelligence signals representing a character sequentially to the respective output means preceded by a "start" signal.

References Cited by the Examiner

UNITED STATES PATENTS

| | | | |
|---|---|---|---|
| 2,946,044 | 7/1960 | Bolgiano et al. | 179—15 |
| 3,016,516 | 1/1962 | Doersam | 340—347 |
| 3,229,259 | 1/1966 | Barker et al. | 179—15 |

DAVID G. REDINBAUGH, *Primary Examiner.*

J. T. STRATMAN, *Assistant Examiner.*